(12) United States Patent
Taylor et al.

(10) Patent No.: US 9,890,497 B2
(45) Date of Patent: Feb. 13, 2018

(54) ANTI-PERSPIRANT GLOVE

(71) Applicant: A T G CEYLON (PRIVATE) LIMITED, IPZ Katunayaka OT (LK)

(72) Inventors: John Arthur Taylor, Shropshire (GB); Agampodi Sunil Shantha Mendis, Kosgoda (LK); Mohamed Fazal Abdeen, Narahenpita (LK); Howard William Thomas Goth, West Yorkshire (GB)

(73) Assignee: A T G CEYLON (PRIVATE) LIMITED, IPZ Katunayaka OT (LK)

( * ) Notice: Subject to any disclaimer, the term of this patent is extended or adjusted under 35 U.S.C. 154(b) by 316 days.

(21) Appl. No.: 14/546,619

(22) Filed: Nov. 18, 2014

(65) Prior Publication Data
US 2015/0082508 A1 Mar. 26, 2015

Related U.S. Application Data

(63) Continuation-in-part of application No. 10/538,054, filed as application No. PCT/GB2004/004900 on Nov. 20, 2004, now Pat. No. 8,894,896.

(30) Foreign Application Priority Data

Mar. 31, 2004 (GB) .................................. 0407210.4

(51) Int. Cl.
*D06M 10/10* (2006.01)
*B29C 41/14* (2006.01)
(Continued)

(52) U.S. Cl.
CPC ............. *D06M 10/10* (2013.01); *B29C 41/14* (2013.01); *B29C 41/34* (2013.01); *D06N 3/0043* (2013.01);
(Continued)

(58) Field of Classification Search
CPC ......... B29C 41/14; B29C 41/34; B29C 41/22; B29C 67/06; D06M 10/10; D06N 3/0043;
(Continued)

(56) References Cited

U.S. PATENT DOCUMENTS 2,293,927 A 8/1942 Beal
2,482,418 A 9/1949 Jenkins
(Continued)

FOREIGN PATENT DOCUMENTS

EP 0 134 484 A1 3/1985
EP 1 591 471 A1 11/2005
(Continued)

OTHER PUBLICATIONS

International Search Report and Written Opinion mailed Mar. 7, 2005 for PCT/GB2004/004900 filed Nov. 20, 2004.
(Continued)

*Primary Examiner* — Stella Yi
(74) *Attorney, Agent, or Firm* — Wegman, Hessler & Vanderburg

(57) ABSTRACT

A method of making garment material, the method having the steps: applying coagulant (34) to a substrate (32); applying a foam (38) of the polymeric material to the substrate (32); allowing the coagulant (34) to coagulate some of the foam (38); and removing uncoagulated foam (38) from the substrate (32) to leave a layer of coagulated polymeric material on the substrate (32).

12 Claims, 14 Drawing Sheets

(51) Int. Cl.
    B29C 41/34     (2006.01)
    D06N 3/00      (2006.01)
    D06N 7/00      (2006.01)
    B29L 31/48     (2006.01)
    A41D 19/00     (2006.01)
    B29C 67/06     (2017.01)
    B29K 105/04    (2006.01)

(52) U.S. Cl.
    CPC ....... *D06N 7/0092* (2013.01); *A41D 19/0065* (2013.01); *A41D 2400/60* (2013.01); *B29C 67/06* (2013.01); *B29K 2105/04* (2013.01); *B29L 2031/48* (2013.01); *B29L 2031/4864* (2013.01); *B29L 2031/4871* (2013.01); *D06N 2211/10* (2013.01)

(58) Field of Classification Search
    CPC .......... D06N 7/0092; B29L 2031/4864; B29D 99/0067; A41D 19/0055
    See application file for complete search history.

(56) References Cited

U.S. PATENT DOCUMENTS

| | | | |
|---|---|---|---|
| 3,079,274 | A | 2/1963 | Marsden et al. |
| 3,665,157 | A | 5/1972 | Harada |
| 3,846,156 | A | 11/1974 | Seibert et al. |
| 4,059,659 | A | 11/1977 | Hilterhaus |
| 4,190,685 | A | 2/1980 | Hart et al. |
| 4,218,779 | A | 8/1980 | Hart et al. |
| 4,439,473 | A | 3/1984 | Lippman |
| 4,497,072 | A | 2/1985 | Watanabe |
| 4,514,460 | A | 4/1985 | Johnson |
| 4,515,851 | A | 5/1985 | Johnson |
| 4,519,098 | A | 5/1985 | Dunmire et al. |
| 4,555,813 | A | 12/1985 | Johnson |
| 4,707,400 | A | 11/1987 | Towery |
| 4,743,470 | A | 5/1988 | Nachtkamp et al. |
| 4,833,173 | A * | 5/1989 | Spek .................... C08J 9/16 427/244 |
| 5,851,338 | A | 12/1998 | Pushaw |
| 5,948,707 | A | 9/1999 | Crawley et al. |
| 6,348,258 | B1 | 2/2002 | Topolkaraev et al. |
| 6,475,562 | B1 | 11/2002 | Vogt et al. |
| 6,599,849 | B1 | 7/2003 | Vogt et al. |
| 2002/0002405 | A1 | 1/2002 | Janusson et al. |
| 2002/0076503 | A1 | 6/2002 | Borreani et al. |
| 2002/0197924 | A1 | 12/2002 | Halley et al. |
| 2003/0066120 | A1 | 4/2003 | Tremblay-Lutter |
| 2003/0090037 | A1 | 5/2003 | Woodford et al. |
| 2005/0150056 | A1 | 7/2005 | Copete Vidal et al. |

FOREIGN PATENT DOCUMENTS

| | | |
|---|---|---|
| GB | 717103 | 10/1954 |
| GB | 1365734 | 9/1974 |
| JP | 63197571 A | 8/1988 |
| JP | 2033317 B2 | 2/1990 |
| JP | 3161501 | 11/1991 |
| JP | 7279044 | 10/1995 |
| JP | 3161501 B2 | 4/2001 |
| JP | 2003268613 A | 9/2003 |
| KR | 1020040100168 | 12/2004 |
| WO | WO 95/26650 A1 | 10/1995 |
| WO | WO 98/06891 A1 | 2/1998 |
| WO | WO 99/48393 A1 | 9/1999 |
| WO | WO 01/58656 A | 8/2001 |
| WO | WO 02/00425 A1 | 1/2002 |
| WO | WO 2004/093580 A2 | 11/2004 |

OTHER PUBLICATIONS

International Preliminary Examination Report mailed Oct. 4, 2006 for PCT/GB2004/004900 filed Nov. 20, 2004.
Annex to the Summons issued in European Patent No. EP 07 012 481.3 0, Jul. 10, 2013, 3 pages.
European Committee for Standardization, "Protective Gloves—General Requirements and Test Methods", European Standard, vol. EN 420:1994, Sep. 2003, 9 pages.
Ansell Occupational Healthcare Brochure, 2002, 7 pages.
Declaration of Paul McMorrow, Quality Coordinator for Ansell Healthcare Products LLC, Sep. 8, 2010, 3 pages.
Declaration of Robert Gaither, Vice President of Sales & Marketing North America for Ansell Protective Products Inc., with Exhibits A-1, A-2, B-1, B-2, Sep. 13, 2010, 5 pages.
Lycra, "What is LYCRA Fiber?", http://www.toray-opt.co.jp/whatslycra/index.html, Japanese and English translations, Jul. 15, 2010, 4 pages total.
JIS Japanese Industrial Standard, JIS L 1099:2006—(JTETC), "Testing Methods for Water Vapour Permeability of Textiles", English translation, 2006, 12 pages.
"First Launch to the Market Summary", 2004, 24 pages.
Zorb-IT, Email referring to Zorb-IT picture and sales sheets, Jun. 10, 2010, 5 pages.
Zorb-IT Sell Sheet Summary, 2010, 7 pages.
Email with reference to a public prior use of Zorb-It gloves, Jul. 20, 2010, 1 page.
Carl, "Neoprene Latex—Principles of Compounding and Processing", Elastomer Chemicals Department, E. I. DuPont, De Nemours & Co. (Inc.), Wilmington, DE, Jul. 1962, 13 pages.
Letter from the Law Offices of Marshall & Melhorn, LLC, Toledo, Ohio, May 15, 2014.
Cook et al. "Neoprene Dipped Goods", Rubber Chemicals Division, E.. du Pont de Nemours & Co. (Inc.), Report No. 52-3, Dec. 1952.
Gelbert et al., "Neoprene Latex and Its Applications with Emphasis on Manufacture of Dipped Goods", presented May 27, 1987 at the Latex Technology Symposium in Montreal, Quebec, Dupont Company.
Letter from Stevens Hewlett & Perkins, Bristol, England, Sep. 21, 2010.
Experimental Report II, Presented in Opposition Against EP 1852548.
"Reasons for the Petition", English Translation of Revocation Act against Korean Patent Application issued Dec. 23, 2011, Translation issued Jan. 20, 2012, 35 pages.
Combined Search and Examination Report under Sections 17 and 18(3) dated Dec. 8, 2015 in GB1507490.9.
Communication of the European Search Report dated Mar. 24, 2016 in EP 15194804.9.
Examination Report Under Section 18(3) dated Feb. 14, 2017 in GB1507490.9.

* cited by examiner

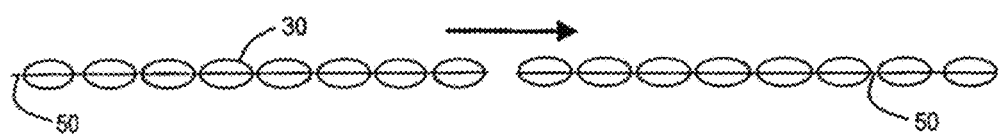
*Fig.5*
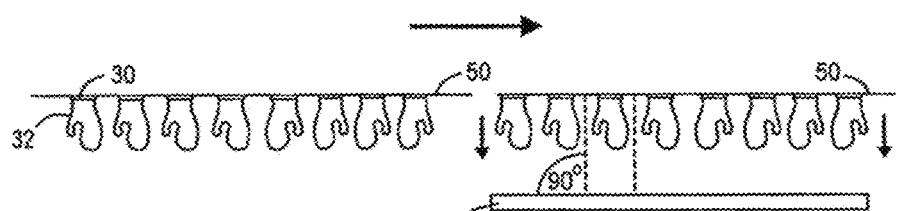
*Fig.6*
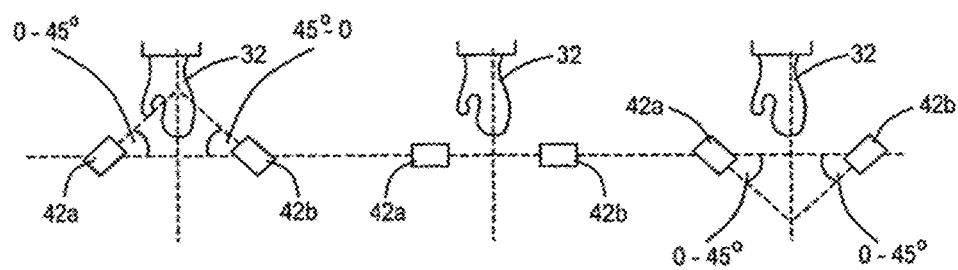
*Fig.7*   *Fig.8*   *Fig.9*

ANTI-PERSPIRANT GLOVE

CROSS REFERENCE TO RELATED APPLICATIONS

This application claims the priority benefit of British Patent Application No. GB 0407210.4 filed Mar. 31, 2004; International Application No. PCT/GB2004/004900 filed Nov. 20, 2004; and U.S. patent application Ser. No. 10/538,054 filed Jan. 13, 2006, all of which are herein incorporated by reference.

This invention relates to polymeric garment material, garments and methods of making polymeric garment material.

Polymeric materials are currently used for a wide range of garments, some of these garments (for example, raincoats and aprons) make use of the protective properties of the material, other garments (for example, footwear, underwear and fashion garments) use polymeric materials because of appearance and/or feel of the material.

FIG. 1 illustrates the steps of a known method of producing a knitted nylon garment that has a polyurethane (PU) coating. At step 10 a knitted nylon lining is fitted on to a mould. The nylon lining acts as a substrate to which the PU coating is applied. FIG. 2 illustrates a sock lining 32 fitted to a mould 30 that supports the lining 32 so that the lining 32 takes the desired shape for the finished garment. In the case illustrated the garment is a sock, however, the method is applicable to other garments. At step 12 the mould 30 (fitted with the sock lining 32) is immersed into a solution of PU and dimethylformamide (DMF). At step 14 the mould 30 is withdrawn from the solution of PU and DMF and excess solution is allowed to drain leaving a coating of the PU/DMF solution on the lining 32. At step 16 the mould is immersed in water. The immersion causes the PU coating on the lining 32 to coagulate, that is the PU coating sets. The mould 30 remains in the water for a period of 90 to 120 minutes so that the DMF solvent is leached out of the lining into the water. At step 18 the mould is removed from the water and placed in an oven to dry the PU coated nylon liner. Finally at step 20 the PU coated nylon liner is removed from the mould 30 and a PU coated nylon sock is obtained.

A major disadvantage with this process is that it uses DMF. DMF is a solvent that is known to be very toxic, and one that is easily absorbed through the skin. Therefore great care has to be taken when handling the solution of PU/DMF. In order that a safe working environment is provided the atmosphere in which the process is carried out needs to be well ventilated and provided with extraction fans.

At step 16, when the DMF is leached into water, the water will become saturated with DMF. Therefore, the water will need to be repeatedly changed—this is both time consuming and expensive. Additionally, since the DMF saturated water solution is toxic, care must be taken when disposing of the DMF saturated water so as to minimise environmental damage that may occur from the disposal.

An alternative to DMF is the use of THF (Tetra Hydro Furan). However THF is also a noxious chemical and has many of the disadvantages associated with DMF.

A further disadvantage of the process is that the PU coating penetrates the interstices of the nylon liner. Therefore, the PU coating will come into contact with the skin of a wearer of a garment made by this process if such a garment is worn next to the skin. This can cause irritation and build up of perspiration next to the skin, and, in particular, some wearers may be allergic to PU. Skin irritation may also be caused by any DMF or THF that has not been removed during the leaching step 16. DMF in particular is readily absorbed through the skin. A further hazard of DMF is that it is known to be carcinogenic and to be the cause of foetal defects.

According to a first aspect of the invention there is provided a method of making garment material, the method having the steps: providing a substrate; applying coagulant to a substrate; applying a foam of the polymeric material to the substrate; allowing the coagulant to coagulate some of the foam leaving some of the foam uncoagulated; and removing uncoagulated foam from the substrate to leave a layer of the coagulated polymeric material on the substrate.

The use of foamed (aerated) polymeric material removes the need for the polymeric material to be dissolved in DMF, THF or, indeed, any other solvent. Therefore, the method is less hazardous and more environmentally friendly. The garment material produced by the method will not contain potentially harmful traces of solvent.

The coagulant may be allowed to coagulate some of the foam for a period in the range 60 to 180 seconds. The step of removing uncoagulated foam may comprise removing an outer layer of the foam to leave an inner layer of coagulated polymeric material on the substrate. The outer layer may be removed before a skin has formed on the outer surface of the foam layer. Obviously no skin will have formed on the surface of the remaining inner layer, so that there is no skin on the final product.

A wide range of polymeric materials are suitable for production, of the foam, these include nitrile latex, natural latex, polyvinylchloride (PVC), polyvinylacetate (PVA) neoprene (polychloroprene) and rubber as well as PU latex. The foam may be produced from one of or a blend of two or more of these polymeric materials. Hence, the method provided by the invention is more widely applicable than the known method (illustrated in FIG. 1), which is restricted to the use of PU.

The substrate may be, for example, knitted nylon but a wide range of materials may be used as the substrate, for example, the substrate may be one of, or a blend of two or more of: cotton, spandex, lycra, polyester, aramid, dyneema, acrylic, carbon conductive fibre, copper conductive fibre, thunderon conductive fibre, multifilament yarn spun from liquid crystal polymer (available under the brand name Nectran™), tactel, CoolMax™, ThermaStat™, Thermax™ and Niafil®. For example, the substrate may be a blend of nylon and lycra and may comprise a blend of 95% nylon and 5% lycra. Such a blend is particularly comfortable to wear, the garment conforming well to the shape of the wearer.

Preferably, the step of removing the uncoagulated foam comprises directing a fluid at the substrate. For example a spray of liquid such as water may be directed at the substrate. Alternatively, the fluid may be a gas, which may be at least predominantly air. The gas may be directed as a jet. The spray of liquid or jet of gas may have a pressure in the range 1 to 10, or more preferably in the range 1 to 4 bar. The fluid may be directed at an angle in the range 0° to 45° to the normal to the surface of the substrate. Alternatively, the step of removing uncoagulated foam from the substrate may comprise immersing the substrate in liquid, for example water.

After removing the uncoagulated foam from the substrate, the method may further comprise the step of immersing the substrate in water to remove coagulant. The substrate may then be dried, for example by placing the substrate in an oven.

A number of suitable coagulants may be used. The coagulant may be either an aqueous solution or an alcoholic solution of one or more electrolytes. The electrolytes may comprise one or more of formic acid, acetic acid, calcium nitrate and calcium chloride.

Before applying coagulant to the substrate, the substrate may be placed on a mould, which may be composed of one or more of metal, ceramic, fibreglass and plastic. The mould may take the form of a portion of the garment or, alternatively, may take the form of a complete garment. The garment may, for example, be a coat, an apron, a boot, a shoe, a sock an item of underwear, a glove or a corset.

Surprisingly, this method of removing the excess, uncoagulated foam leaves behind a cohesive, porous and breathable layer of polymeric material on the substrate. A garment made from the garment material produced in this way allows perspiration to escape from the wearer of the garment and reduces heat build up within the garment.

The garment material is more flexible and lightweight and garments made from the garment material are more comfortable to wear than garments produced by the prior art method illustrated in FIG. 1.

The penetration of the foam into the substrate may be controlled so that the foam does not fully penetrate the substrate. In this way, the garment material produced has an inner surface that does not have exposed polymeric material. This is advantageous since many people have an allergic reaction to polymeric materials (especially latex) worn next to the skin and the non-penetrated portion of the substrate forms a barrier between the wearer of the garment and the coating of the polymeric material. The risk of further skin irritation caused by solvents such as DMF and THF is also removed since this process removes the need for such solvents. This is particularly important as DMF is readily absorbed through the skin and is known both to be carcinogenic and to cause foetal defects.

After the excess and partially coagulated foam is removed, dressing compositions may be applied to the garment material. The dressing composition may be applied either before or after the garment material is removed from the mould. The dressing composition may comprise any liquid, powder or suspension composition that provides additional properties to the garment material. The dressing material may be encapsulated and applied in the form of an encapsulate, which may comprise encapsulate particles each comprising an outer shell containing a volume of the dressing composition. The shell may be formed, for example, of melamine or gelatine, or indeed any other suitable material. The particles may have a mean diameter in range 0.1-10 µm in diameter. They may have a mean diameter no less than 0.5 µm. They may have a mean diameter no more than 5 µm One or more bonding agents may be applied to the garment material before or at the same time as the dressing composition to ensure that the dressing composition adheres to the garment material. The bonding agents may be any known bonding agents or mixtures of bonding agents. The bonding agents may comprise one or more bonding agents, for example, polyvinyl alcohol (PVA), Styrene Butadiene Rubber SBR, Ethylene Vinyl Acetate (EVA), polyurethane (PU)) and/or nitrile rubber (NBR). Solutions of the bonding agents may comprise from about 1% to 5% of each bonding agent or from about 1% to about 5% total bonding agent for a mixture of bonding agents. For example a 1 to 5% solution of PVA, PU and/or NBR in water.

The one or more bonding agents may be liquid or in solution. The one or more bonding agents may be applied to the garment material by washing, dipping, soaking, spraying and/or painting the garment material in a liquid or solution comprising a sufficient quantity of the bonding agents.

The garment material according to the present invention is a particularly advantageous garment material for the addition of dressing compositions because it has a rough or porous surface coating that allows the dressing composition to stick or penetrate inside the depressions or recesses in the open cell structure caused by removing uncoagulated polymer foam and preventing a skin from forming on the outside of the polymer. The open cell porous coating means that the coating is able to absorb, or retain, more of the dressing composition due to the large surface area of the open cell structure. Where the dressing composition adheres within the open cell structure of polymer coating it is unlikely to be rubbed off during use of the garment material.

The dressing composition may be any composition that provides enhanced properties to the garment material. The dressing composition may, for example, comprise one or more compounds that provide an antiperspirant effect and/or a cooling effect to enhance the breathability and/or the coolness of the garment material thus making the garment more comfortable to wear over long periods of time. The dressing composition may comprise one or more: scented compounds, anti-static compounds, anti-bacterial compounds, anti-fungal compounds and/or warming compounds.

The dressing composition may be a blend of essential oils, for example a blend of encapsulated essential oils. The dressing composition may be an encapsulated blend of cooling essential oils. A blend of cooling essential oils may comprise, for example Cajiput, Cypress Palmarosa, Rose, Geranium, Pine and/or Lavender oils. A garment material dressed with a dressing composition comprising cooling essential oils is advantageous because it feels cool to the wearer. The dressing composition may be an encapsulated blend of antiperspirant essential oils. A blend of anti-perspirant essential oils may comprise, for example, Juniper, Sage, Witch Hazel, Cistus, Tea Tree, Eucalyptus and/or Basil oils. Encapsulated essential oils may also provide antibacterial and/or antifungal properties. A garment material dressed with a dressing composition comprising antiperspirant essential oils is advantageous because the wearer feels comfortable and not sweaty when wearing the garment material. This is particularly advantageous for a garment material of the present invention because the garment material is breathable and the cooling and antiperspirant essential oils also provide additional cooling and antiperspirant effects. This keeps the wearer cooler and is more comfortable for the wearer in hot conditions or when wearing the garment material during strenuous activities or for extended periods of time.

The garment material may be dressed with more than one dressing compositions, for example an encapsulated blend of cooling essential oils and an encapsulated blend of antiperspirant essential oils. The two or more dressing compositions may be applied simultaneously or sequentially and may be applied simultaneously with the bonding agents or after the bonding agents.

The dressing composition may comprise encapsulated essential oils, for example the essential oils may be selected from tea tree, eucalyptus, sage, cypress, geranium palmarosa, cistus, witchhazel, pine, rosegeranium, eucalyptus, lavender, juniper, cajiput and other essential oils.

Dressing compositions, for example encapsulated essential oils, suspended or dissolved in water may be applied to the garment material before removing the garment material from the mould. The garment material may first be washed to remove residual coagulant and at least partially dried, then the garment material may be dipped or soaked in bonding solution, for example a 1 to 5% solution of PVA; PU or NBR; and/or EVA in water and allowed to drain.

The garment material may then be dipped or soaked in dressing composition dissolved or suspended in water or another solvent. For example encapsulated essential oils may be a suspension of 2 to 5 grams of encapsulated essential oils per litre of water. The suspension of encapsulated essential oils may be maintained at between 50° C. and 80° C. The garment material may be allowed to drain for a suitable time, for example 5 to 10 minutes, to allow excess liquid to drain away. The garment material may be dipped or soaked in two or more suspensions of dressing compounds, for example encapsulated essential oils, either concurrently or sequentially and excess liquid may be allowed to drain between each. The garment material may optionally be dried between application of each dressing composition, for example in an oven for 20 to 30 minutes at a suitable temperature that is not high enough to damage the garment material or dressing composition, for example between 50 and 70° C.

The garment material may then be cured and removed from the moulds. Once the dressing compositions have been applied and the garment material has been cured further washing may be used to remove unwanted impurities without affecting the dressing composition.

Dressing composition may be applied to the garment material after removing the garment material from the mould by washing the garment material in a solution or suspension of bonding agents and the dressing composition (or each of these separately), for example 2 to 5 grams of encapsulated essential oils per litre of water at 50° C. to ° C. and 1 to 2 grams per litre of bonding agents such as PVA, (PU or NBR.) SBR and/or EVA.

Whether the dressing composition is applied to the garment material while it is on the mould or after it is removed from the mould, the dressing composition penetrates through the foamed polymer layer to the substrate layer. The dressing composition therefore adheres on both the inside and the outside of the garment material. This is advantageous because some of the dressing composition may be on the surface of the garment material that is worn next to the skin and the dressing composition may be in contact with the skin. This is advantageous because the effect of the dressing composition may be felt on the skin, for example a dressing composition comprising anti perspirant essential oils may have an anti perspirant effect on the skin. A dressing composition comprising cooling essential oils may have a cooling effect on the skin.

According to a second aspect of the invention there is provided garment material produced by the method of the first aspect of the invention.

According to a third aspect of the invention there is provided a garment produced by the method of the first aspect of the invention.

According to a fourth aspect of the invention there is provided a garment or garment material having a substrate and a layer of coagulated polymeric material penetrating at least partially the substrate, the garment or garment material having a water vapour permeability in the range 3.5 to 6.5 mg·cm$^{-2}$ h$^{-1}$.

According to a fifth aspect of the invention there is provided a garment or garment material having a substrate and a layer of coagulated polymeric material penetrating the substrate, wherein the polymeric material does not fully penetrate the substrate.

According to a sixth aspect of the invention there is provided a garment or garment material having a substrate and a layer of coagulated polymeric material penetrating at least partially the substrate, wherein the garment or garment material has a water vapour permeability in the range 3.5 to 6.5 mg·cm$^{-2}$ h$^{-1}$. Prefer ably the garment or garment material has a water vapour permeability in the range 5.0 to 6.5 mg·cm$^{-2}$ h$^{-1}$.

According to a seventh aspect of the invention there is provided a garment or garment material which, when subjected to a temperature of 20±2° C. and a relative humidity of 65±2% for 265 minutes, will hold between 1.0 mg and 8.5 mg of water per cm$^2$ of the garment or garment material.

Preferably the garment or garment material, when subjected to a temperature of 20±2° C. and a relative humidity of 65±2% for 265 minutes, will hold between 1.0 mg and 5.5 mg of water per cm$^2$ of the garment or garment material.

According to an eighth aspect of the invention there is provided a method of applying discrete areas of polymeric coating to the layer of coagulated foam of a garment or garment material produced by the method of the first aspect of the invention. The method may further comprise at least one of the steps of: washing the garment or garment material to remove residue; partially drying the garment or garment material providing an array former; and dressing the garment or garment material on the array former; before applying the polymeric coating; and then curing the layer of coating; and stripping the garment or garment material from the array former after applying the polymeric coating.

Preferably, the garment or garment material is washed with a solution of water and detergent. The garment or garment material is preferably partially dried at a temperature of around 50-70° C. Advantageously, only partially drying the washed garment or garment material so that the layer of coating is applied to a damp coagulated polymeric layer improves the bonding between the layer of coating and the coagulated foam.

The layer of coating may comprise one of or a blend o two or more of nitrile latex, natural latex, PU latex and latex and preferably has a viscosity of around 100-400 poise.

The layer of coating may be cured for 30-45 min at a temperature of 60-140° C. Alternatively, the layer of coating may be cured in two stages. The first stage may comprise 15-30 min at 60-80° C. The second stage may comprise 20-40 min at 120-150° C. The layer of coating may have a thickness of around 0.2-2.0 mm before curing, which may be reduced to around 0.05-1.0 mm after curing.

The array of discrete areas of coating may comprise an array of dots or alternatively may comprise a combination of an array of dots and strengthening patches.

According to a ninth embodiment of the invention there is provided a garment or garment material produced by the eighth aspect of the invention.

According to a tenth aspect of the invention there is provided apparatus for producing garment material comprising a mould arranged to support a substrate, foam application means arranged to apply a foam of a polymeric material to the substrates, and foam removing means arranged to remove uncoagulated foam from the substrate to leave a layer of coagulated polymeric material on the substrate.

The apparatus may further comprise dot application means arranged to apply a dot coating to the layer of coagulated polymeric material.

The apparatus may also comprise at least one of washing means arranged to remove any residue from the garment material, drying means arranged to partially dry the washed garment material, and curing means arranged to cure the dot coating.

Preferred embodiments of the present invention will now be described, by way of example only, with reference to the accompanying drawings in which:

FIG. 1 schematically illustrates a prior art method of making polyurethane coated garments;

FIG. 2 schematically illustrates a substrate that has been placed on a mould;

FIG. 3 schematically illustrates a method of making garment material according to an embodiment of the invention;

FIG. 4 schematically illustrates a system for making garment material according to an embodiment of the invention;

FIG. 5 schematically illustrates a plan view of a flight bar to which several moulds are mounted;

FIG. 6 schematically illustrates a side view of the flight bar of FIG. 5, the flight bar being translated into a spraying station;

FIG. 7 schematically illustrates a side view of a garment substrate in a section of the spraying station of FIG. 6 in which nozzles are pointing upwards;

FIG. 8 schematically illustrates a side view of a garment substrate in a section of the spraying station of FIG. 6, in which nozzles are pointing horizontally; and FIG. 9 schematically illustrates a side view of a garment substrate in a section of the spraying station of FIG. 6, in which nozzles are pointing downwards.

FIG. 10 illustrates a discrete array of areas of polymeric coating applied to the surface of a garment or garment material produced using the method of FIG. 3.

FIG. 11 schematically illustrates a method of applying a discrete array of areas of polymeric coating to the surface of a garment or garment material produced using the method of FIG. 3.

FIG. 12 schematically illustrates a cross section through the garment or garment material of FIG. 10.

Figure 15:
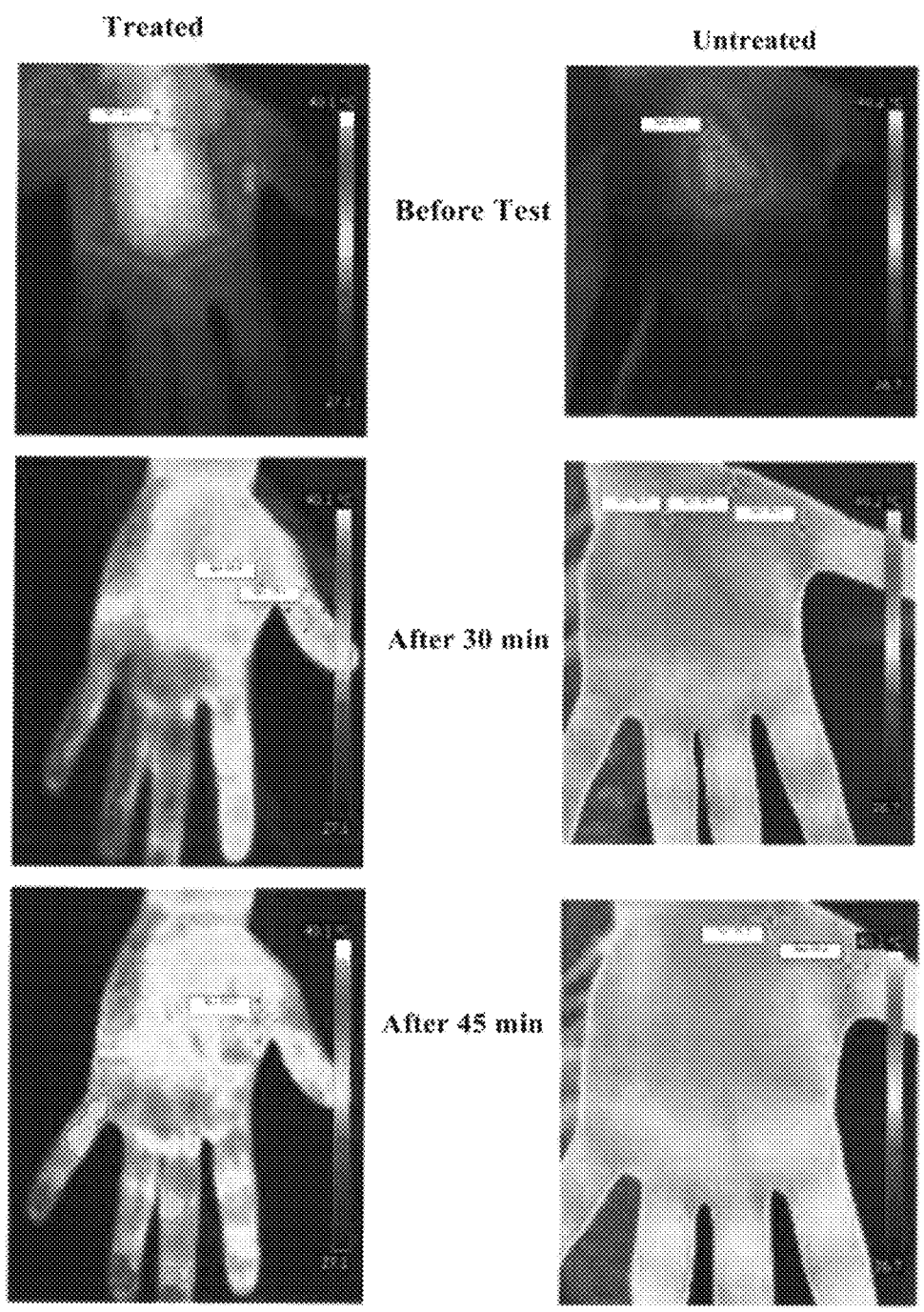

FIG. 15 shows thermal images of the left hand of subject 1 wearing a glove. The left column shows the hand wearing a glove treated with encapsulated anti-perspirant essential oils and encapsulated cooling essential oils (Formula A and Formula B). The right column shows the same hand wearing an untreated glove of the same type. The images were taken before the ergonomic test (top panels), 30 minutes into the ergonomic test (centre panels) and at the end of the ergonomic test (bottom panels). The gloves used were Maxiflex 34-87A treated or untreated size 9 and the climatic chamber was at 27° C. and 60% rh.

Figure 16:
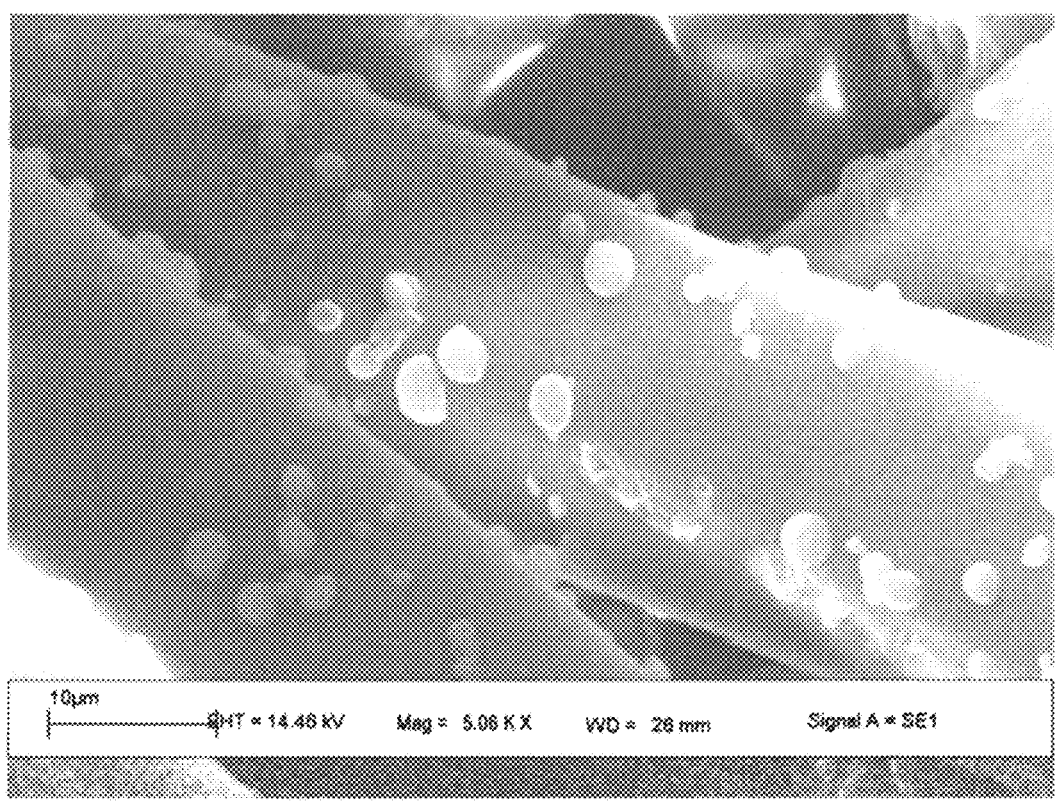

FIG. 16 shows a scanning electron micrograph of the garment material. This is a view from the inside surface of a glove showing the substrate material with encapsulated cooling and anti-perspirant essential oils adhered to the surface of the fibres. The fibres are of the substrate material 95% nylon with 5% lycra.

Figure 17:
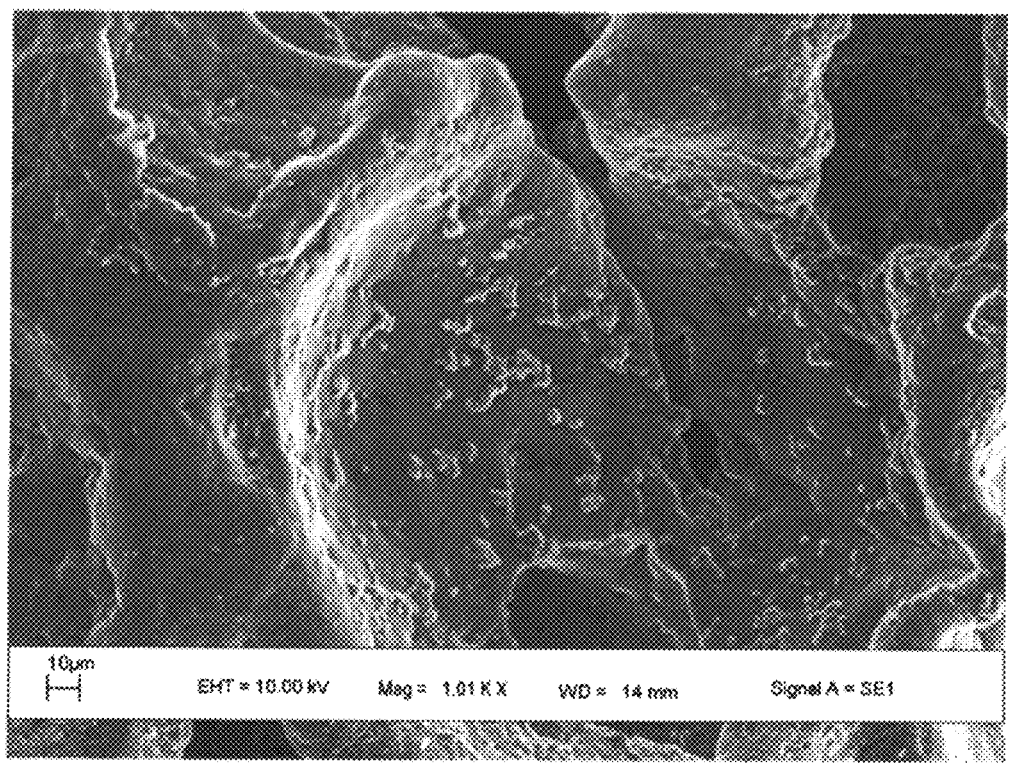

FIG. 17 shows a scanning electron micrograph of the outside surface of a glove showing the open pore polymer foam surface with encapsulated cooling and anti-perspirant essential oils adhered to the surface and within the depressions of the surface that are caused by the open pore structure of the polymer foam surface.

Figure 18:
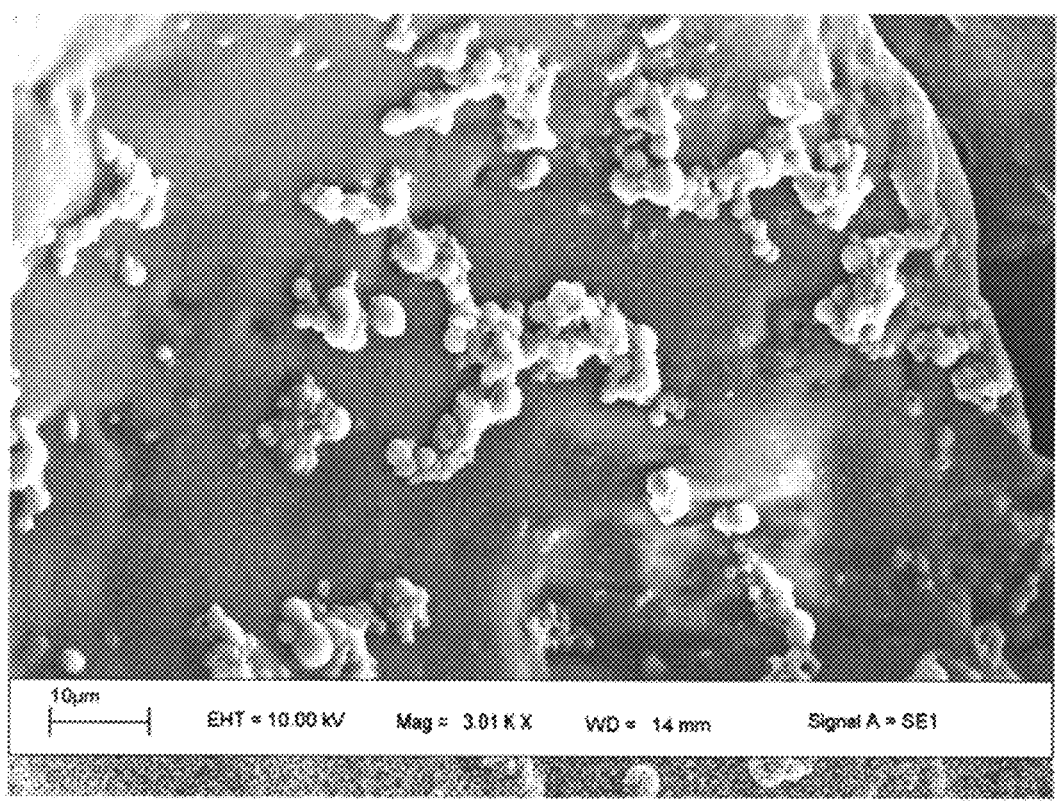

FIG. 18 shows a close up of the a scanning electron micrograph of FIG. 18 showing the inside of one of the depressions caused by the open pore structure and encapsulated cooling and anti-perspirant essential oils adhered to the inside of the depressions in the polymer foam.

Figure 19:
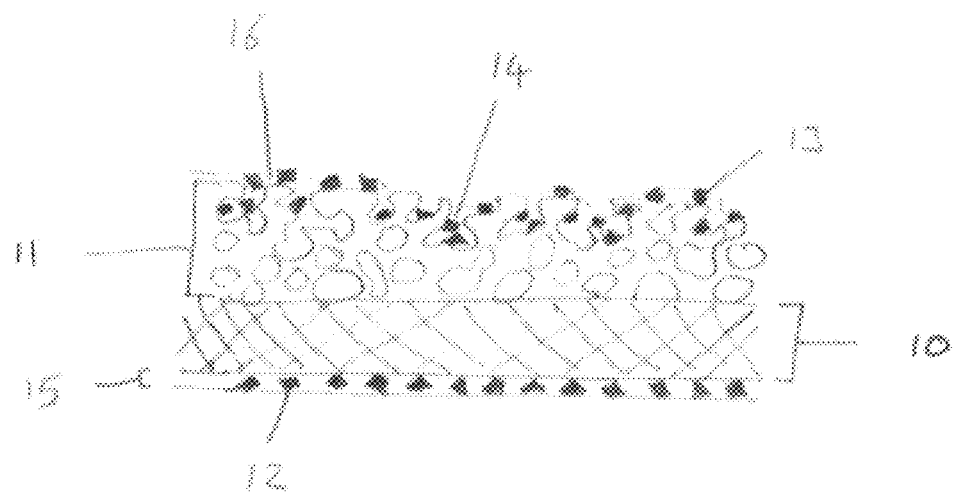

FIG. 19 shows a cross-section view of the garment material with encapsulates adhered to the surface.

Figure 20:
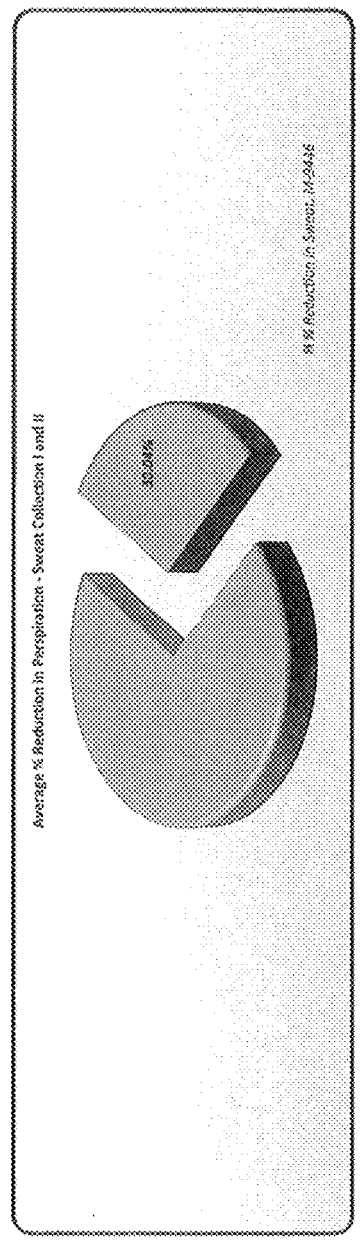

FIG. 20 shows table 5 and the results of a study of the average amount of hand perspiration with the treated gloves.

Figure 3:
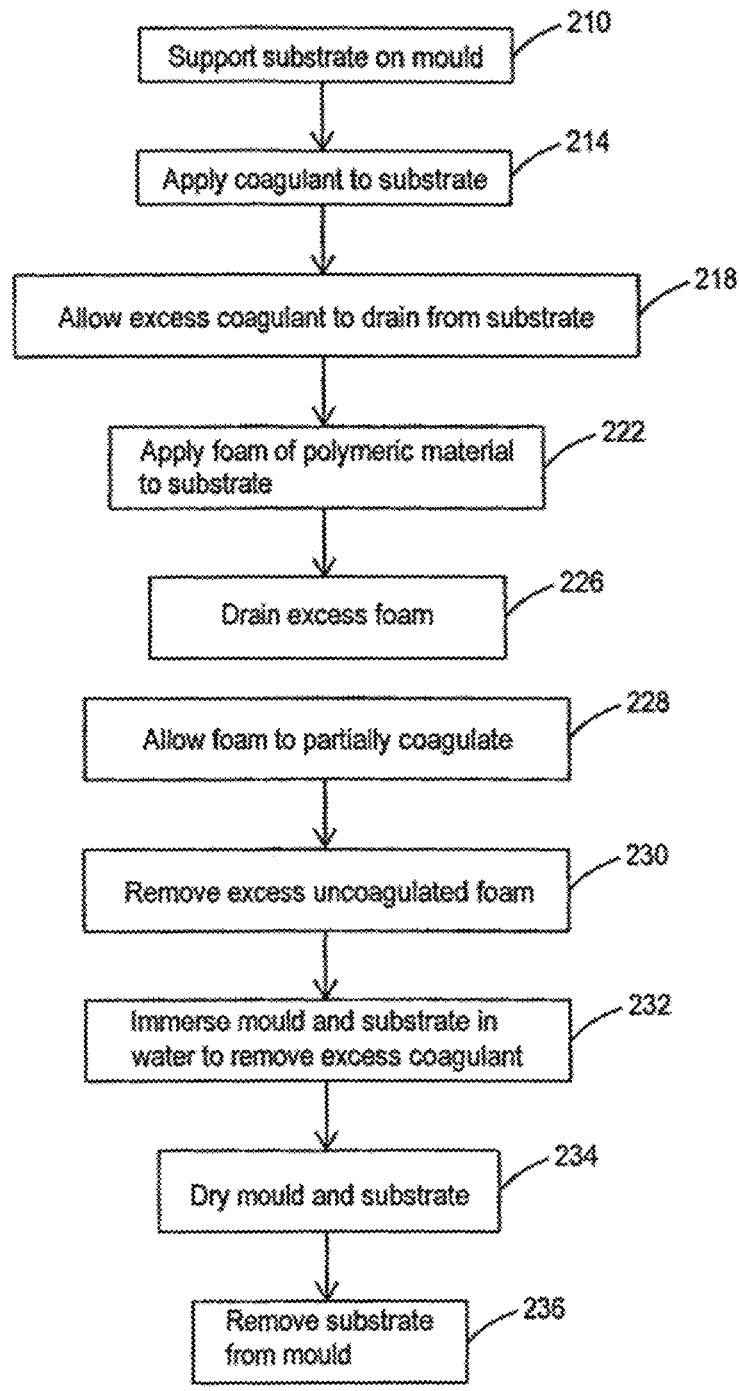
Figure 4:
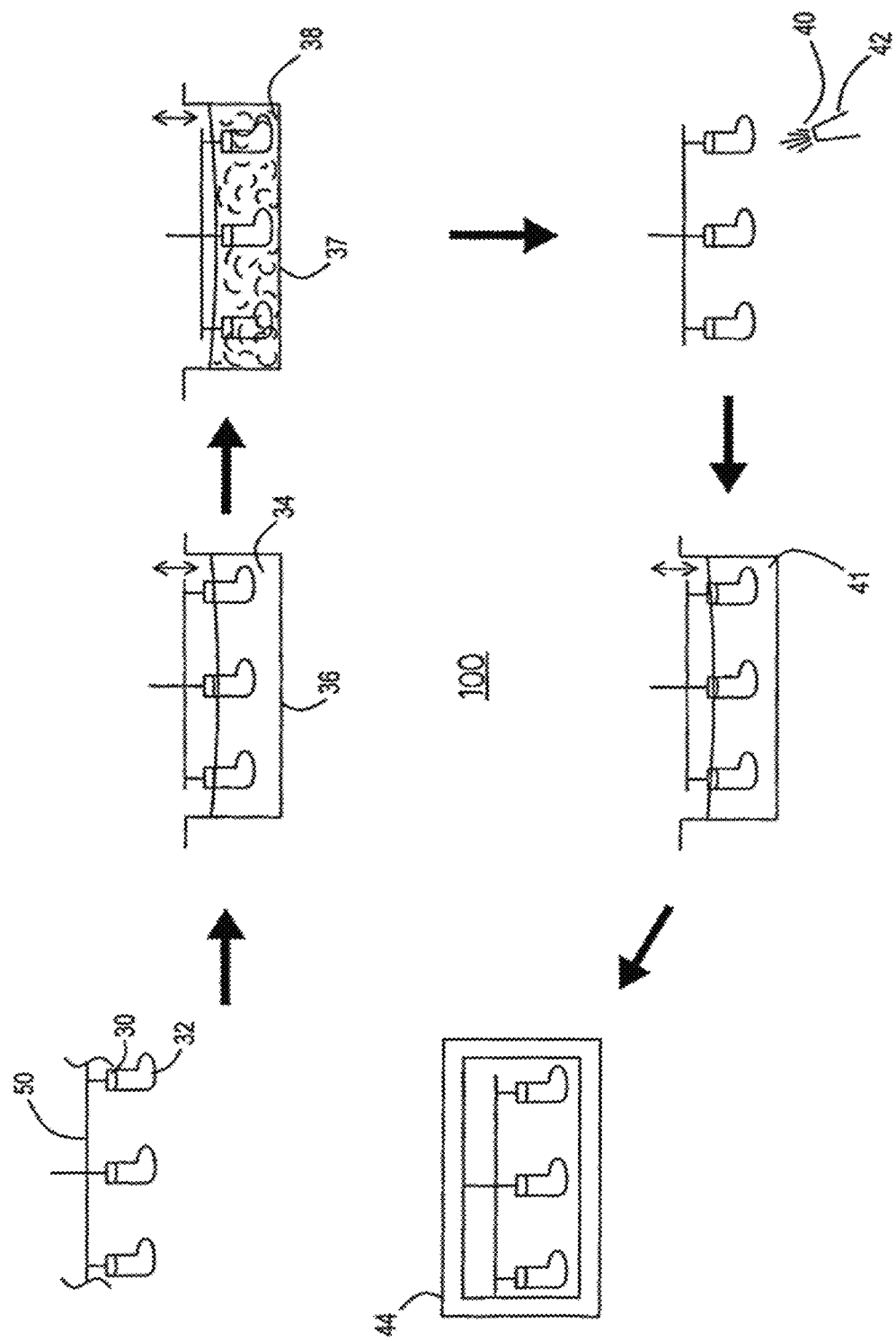

Referring to FIGS. 3 and 4, to make a garment according to an embodiment of the invention, at step 210 a lining or substrate 32 is fitted to a mould 30. The mould 30 supports the substrate 32 during the various process steps that are applied to the substrate 32 to produce the garment material. After the garment material has been made it is removed from the mould 30.

Figure 2:
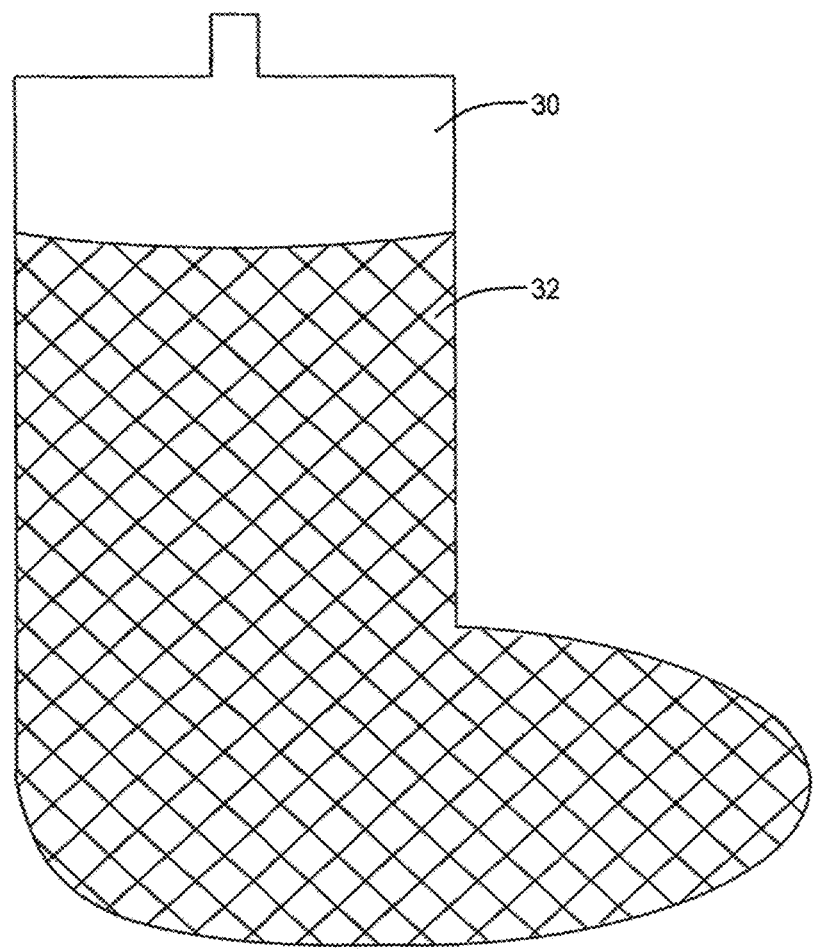

The substrate 32 may take the form of a complete garment, for example, a sock (as is illustrated in FIG. 2) or in a form that is a section of a garment, for example a pocket for a coat. In such cases the mould 32 provides the correct shape for the finished garment or garment section. When the mould takes the shape of a finished garment it is preferable that the substrate 32 fitted on to the mould 30 is seamless so that the finished garment is also seamless. Alternatively, the mould 32 need not take any particular form and sheets of garment material are formed by the process. For example, the substrate may be stretched out between two clamps or rollers, and for the purpose of this specification the term "mould" covers arrangements of clamps, rollers and the like that support the substrate 32 by applying tension to the substrate 32. In this case, garment or garment sections are produced by further processing of the sheets of garment material for example by pieces being cut from the sheet of garment material and then the pieces being used to make a garment.

The mould 30 may be made from, for example, metal, porcelain, fibreglass or plastic.

Suitable materials for the substrate 32 include one of, or a blend of two or more of: nylon, cotton, spandex, lycra, polyester, ara.mid, dyneema, acrylic, carbon conductive fibre, copper conductive fibre, thunderon conductive fibre, multifilament yarn spun from liquid crystal polymer (available under the brand name Nectran™), tactel, CoolMax™, ThermaStat™, Thermax™ and Niafil®. For example, the substrate could comprise a blend of 95% nylon and 5% lycra. The substrate 32 has a lattice structure and may be formed by knitting, weaving or some other known process.

The process may be applied to batches of substrates (batch-processing) such that the process steps are applied to a group of moulds 30, each mould 30 supporting a substrate 32. Alternatively, the process may be applied continuously such that the moulds 30 are continuously translated through the system 100. Of course, the moulds 30 may be continuously translated through some parts of the system 100 and stationary for periods of time at other parts of the system 100 according to what particular process step is occurring at those positions. Referring to FIG. 5, the moulds 30, bearing the substrates 32 are mounted in a row on a bar 50, termed a "flight bar". In the example illustrated, four pairs of moulds 30 (bearing four pairs of gloves respectively) are mounted on a flight bar 50. The flight bar 50 moves in a linear direction from one process station to another at a set speed. Of course, the speed at which the flight bar is set can be varied. There may be several flight bars 50, each flight bar 50 being at a different stage of the process, and the movement of a flight bar 50 from one station to the next is at set intervals.

At step 214 coagulant 34 is applied to the substrate 32. This may be achieved by immersing the substrate 32 (supported on the mould 30) into a bath or trough 36 containing the coagulant 34 or by spraying the coagulant 34 onto the substrate 32. The coagulant 34 is an aqueous or alcoholic solution of electrolytes. Suitable electrolytes include formic acid, acetic acid, calcium nitrate, calcium chloride or a mixture of two or more of these. Ethanol may be used to provide the alcoholic solution of electrolytes but other alcohols are also suitable, for example, iso-propyl alcohol and methanol may also be used.

At step 218 excess coagulant 34, i.e. coagulant that is not absorbed by the substrate 32 is allowed to drain from the substrate 32. If the coagulant 34 was applied by immersion in a bath/trough 36 of coagulant 34 then step 218 involves withdrawal of the mould 30 from the bath/trough 36.

Alternatively, to apply the coagulant to the substrate, the substrate can be pressed onto a sponge saturated with coagulant. This method reduces the amount of coagulant picked up by the substrate, avoiding the need to allow time for excess coagulant to drain from the substrate.

At step 222 a foam 38 of polymeric material is applied to the substrate 32, for example by immersing the mould 30 supporting the substrate 32 into a bath/trough 37 of the foam 38. The production of a foam 38 of polymeric material is well known to a skilled person. The foam 38 may be formed from one of, or combination of, several polymeric materials. Suitable polymeric materials include PU latex, nitrile latex, natural latex, polyvinylchloride (PNC), polyvinylacetate (PNA), neoprene (polychloroprene) and rubber. The foam 38 has a density in the range 15-35%, i.e. there is 15-35% air by volume in the foam and a viscosity in the range 80-180 poise (8-18 Ns/m$^2$). The foam 38 contains thickeners so that the foam 38 is of the required viscosity. The thickeners are usually added to the polymeric material when the polymeric material is in liquid form, i.e. before it is aerated. Examples of thickeners include polyvinyl alcohol (0.2-0.6 parts per 100 parts polymeric material by volume) methyl cellulose (0.2-0.8 parts per 100 parts polymeric material by volume) and polyacrylate (0.2-0.6 parts per 100 parts polymeric material by volume). The foam also contains stabilisers so that the foam 38 is stable (i.e. does not degrade to a liquid) and curatives that provide the polymeric coating obtained from the foam with mechanical strength so that the coating is resistant to, for example, abrasion, punctures and tearing. The stabilisers and curatives are usually added to the polymeric material when the polymeric material is in liquid form. Examples of stabilisers include diphenyl guanidine alcohol (with a concentration of about 0.5 parts per 100 parts polymeric material by volume) and alkali casein (0.3-0.8 parts per 100 parts polymeric material by volume). Although the thickeners, stabilisers and curatives are normally added to the liquid polymeric material before it is aerated, they can also be added after aeration, for example if modification of the foam properties is required (for example by adding more thickener to increase the viscosity of the foam).

At step 226 the substrate 32 is removed from the foam 38 and excess foam is allowed to drain from the substrate 32 to leave a layer of foam 38 on the substrate 32. The foam is arranged, as described in more detail below, not to pass through the substrate 32, but to remain on the outer surface or pass part way through the substrate. The foam therefore forms a layer on the outside of the substrate 32.

At step 228 the foam 38 reacts with the coagulant 34 that has been absorbed by the substrate 32 causing coagulation of the foam 38.

Only partial coagulation of the foam 38 is required, therefore, the foam 38 is allowed to react with the coagulant 34 for a limited period of time. After this period of time the foam closest to the substrate 32 will be coagulated but the degree of coagulation progressively decreases with distance from the substrate 32 so that the outer surface of the foam will not be coagulated (i.e., the outer surface will be wet). Typically the foam 38 is allowed to react with the coagulant 34 for a period in the range of 60-180 seconds before the excess (uncoagulated) foam 38 is removed. This period is controlled so that the underside of the foam layer that is in contact with the substrate 32 coagulates, but the outer part of the foam layer does not coagulate. Therefore, a film skin is not formed on the outer surface of the foam layer. The foam layer has a thickness in the range 0.5-1.5 mm.

At step 230 the outer layer of excess, uncoagulated foam 38 is removed from substantially the whole area of the foam layer on the substrate 32. This may be done by directing one or more sprays of water 40 at the substrate 32. The water is directed at the substrate 32 via one or more nozzles 42. Each spray of water 40 has a pressure in the range 1-4 bar ($1\times10^5$-$4\times10^5$ N/m$^2$). The spraying process lasts for about 5-20 seconds.

The nozzles 42 may be stationary with a set orientation relative to the substrate 32. Alternatively, the nozzles 42 may be moveable so that the orientation of the nozzle 42 relative to the substrate 32 can be varied during the spraying process. The nozzles 42 may also be translatable relative to substrate 32 during the spraying process to provide good coverage of the substrate 32 with the spray 40. It is also possible to use a continuous jet instead of a spray, however, a spray is preferred since this makes more economical use of water.

Referring to FIGS. 6 to 9, according to an embodiment of the invention the moulds 30, bearing the substrates 32, are translated on a flight bar 50 to a spraying station 52. FIGS. 6 to 9 illustrate the substrate 32 in the form of a glove lining with the fingers of the glove lining pointing downwards (of course the invention is applicable to sock linings and other garment substrates). The spraying station 52 comprises a number of spray nozzles 42. The nozzles form two rows 43 that are orientated so that the nozzles of one row sprays the front of the substrate 32 (e.g. the palm side of the glove linings 32) whilst the nozzles of the other row spray the back of the substrate 32 (e.g. the backhand side of the glove linings 32). The nozzles 42 are in a fixed position with a pre-set spraying angle and the nozzles 42 do not move during the spraying process. The spraying angle of each nozzle 42 is in the range 0 to 45° to the horizontal (the horizontal being the normal to the surface of the substrate 32) and the spraying angle may be adjusted before the spraying process. The nozzles 42 may be arranged as pairs with a nozzle 42a on one row facing a nozzle 42b of the other row. The nozzles 42a, 42b may be set at different angles: for example the pair of nozzles 42a, 42b may point upwards at about 45° to the horizontal as illustrated in FIG. 7; the nozzles 42a, 42b may point horizontally as illustrated in FIG. 8; or the nozzles 42a, 42b may point downwards at 45° to the horizontal illustrated in FIG. 9. It is not necessary for the nozzles 42a, 42b in each pair to be orientated at the same angle to the horizontal.

As water is pumped through the nozzles 42 the flight bar 50 is translated vertically through the spray produced by the nozzles 42. For example, the moulds 30 are first moved downwardly through the sprays and then upwardly through the spray as the moulds are moved through the spraying station on the flight bar 50.

Other fluids could be used to remove the foam 38, for example a jet of compressed air could be directed at the substrate 32. The foam 38 could also be removed by immersing the substrate 32 in a bath/trough of an aqueous medium. The aqueous medium may comprise an anti-foam agent such as an emulsion of organo-modified polysiloxanes in the concentration range 0.01-0.1% by volume or a blend of petroleum and amorphous silica in the concentration range 0.2-0.8% by volume.

The removal of the excess foam 38, by directing fluid at the substrate 32, leaves behind a cohesive, porous and breathable layer of polymeric material on the substrate 32. At this stage of the process the layer of polymeric material has a thickness in the range 0.34-1.0 mm.

At step 232 excess coagulant 34 is removed from the substrate 32. This may be done by immersing the substrate 32 into a bath/trough of water 41; typically the immersion is for a period of about 15 minutes.

At step 234 the substrate 32 with its layer of polymeric material is dried. The drying may be done in an oven 44 which may be fitted with one or more fans that distribute the heat evenly throughout the oven 44. The drying could also be achieved by directing air over the substrate 32. The air may be dried and/or heated before it is directed over the substrate 32.

After being dried, the layer of polymeric material has a thickness in the range 0.26-0.80 mm.

At step 236, the garment material, comprising the substrate 32 with the polymeric coating, is removed from the mould 30.

The garment material produced by the above process has a uniform porosity.

The penetration of the foam 38 into the substrate 32 can be controlled so that the foam does not fully penetrate the substrate 32. In this way, the garment material produced has an inner surface with no, or very little, exposed polymeric material. This is advantageous since many people are have an allergic reaction to polymeric materials (especially latex) worn next to the skin and the non-penetrated portion of the substrate 32 would form a barrier between the wearer of the garment and the coating of the polymeric material.

The penetration of the foam into the substrate (and the porosity of the finished garment material) can be controlled by varying a number of parameters including:
 i. the formulation of the polymeric material;
 ii. the formulation of the coagulant;
 iii. the time between applying the coagulant and applying the foam;
 iv. the time between applying the foam and removing excess (uncoagulated) foam;
 v. foam density;
 vi. foam viscosity; and
 vii. the weight and construction of the substrate.

The parameter values disclosed in the description provide fabric material that has the desired properties, however, the skilled person may achieve the advantages of the invention using a method having parameters that vary from those given.

The garment material produced by the invention is particularly suitable for gloves, for example gardening gloves and gloves used for light assembly (for example the assembly of electronic components). Such gloves (particularly gloves for light assembly) need to provide the wearer with a high degree of dexterity and, when the gloves are worn for a long period of time, the hands need to be kept cool, dry and comfortable. Gloves made by the process of the invention allow perspiration to escape from the glove/be absorbed by the glove and the hands of the wearer are not irritated by the glove (either by heat build up, sweat, solvent residue or polymeric material present on the lining of the glove). The increased flexibility of the polymeric coating, compared to the coatings of prior art garment material, allows for better dexterity and usability of the gloves.

Gloves made according to the invention were tested for water vapour permeability and absorption of water. The tests were performed on samples taken from four different gloves at a temperature of 20±2° C. and a relative humidity of 65±2%. The thickness of all these samples was 1.08 mm. The results of these tests are given in table 1.

Figure 1:
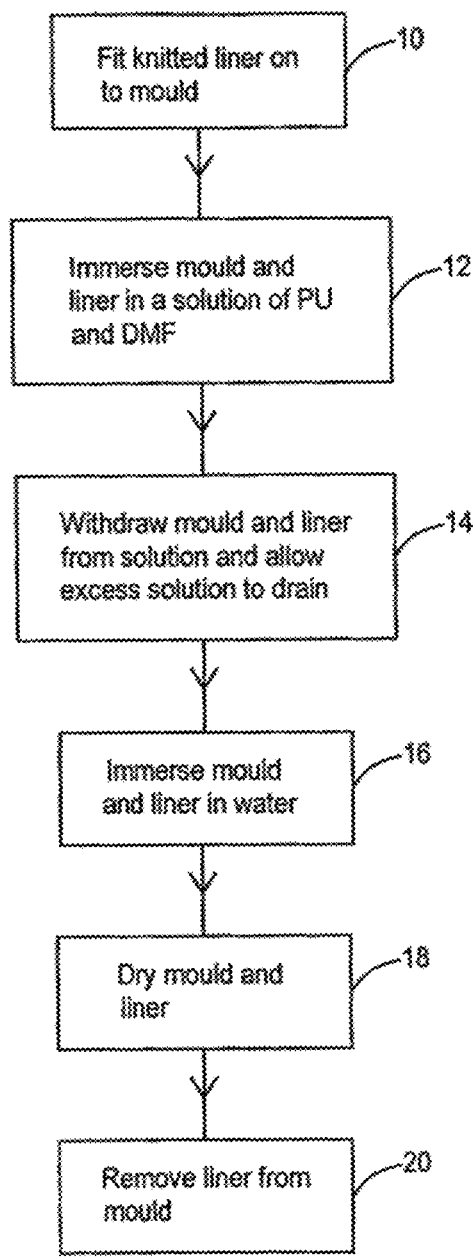

For comparison, samples from four prior art gloves were also tested under the same conditions. The prior art gloves were made by using a solution of polyurethane (PU) dissolved in DMF according to the method illustrated in FIG. 1. The thickness of each of these samples was 1.03 mm with an area of 18 cm$^2$. The results for these tests are given in Table 2.

The water vapour permeability figures are given in units of milligrams of water that pass through a square centimetre of the sample in one hour (mg·cm$^{-2}$·h$^{-1}$). The absorption figures are given in milligrams of water absorbed by the whole sample as measured, with equivalents per square centimetre of the samples in brackets, after set periods of time at a temperature of 20±2° C. and a relative humidity of 65±2%.

TABLE 1

Test results for samples taken from gloves according to an embodiment of the invention.

|  | Sample 1 | Sample 2 | Sample 3 | Sample 4 |
|---|---|---|---|---|
| Permeability (mg · cm$^{-2}$ · h$^{-1}$) | 5.77 | 3.94 | 6.16 | 5.38 |
| Absorption (mg.) after 265 minutes | 45 (2.5 cm$^{-2}$) | 111 (6.2 cm$^{-2}$) | 32 (1.8 cm$^{-2}$) | 67 (3.7 cm$^{-2}$) |
| Absorption (mg.) after 400 minutes | 44 (2.4 cm$^{-2}$) | 143 (7.9 cm$^{-2}$) | 28 (1.6 cm$^{-2}$) | 69 (3.8 cm$^{-2}$) |

TABLE 2

Test results for samples taken from prior art gloves made using a solution of PU in DMF.

|  | Sample 1 | Sample 2 | Sample 3 | Sample 4 |
|---|---|---|---|---|
| Permeability (mg · cm$^{-2}$ · h$^{-1}$) | 10.47 | 10.39 | 10.47 | 10.33 |
| Absorption (mg.) after 265 minutes | 1 (0.06 cm$^{-2}$) | 2 (0.11 cm$^{-2}$) | 3 (0.17 cm$^{-2}$) | 1 (0.06 cm$^{-2}$) |
| Absorption (mg.) after 400 minutes | 3 (0.17 cm$^{-2}$) | 1 (0.06 cm$^{-2}$) | 2 (0.11 cm$^{-2}$) | 0 (0 cm$^{-2}$) |

The average permeability of the samples taken from the gloves according to embodiment of the invention was 5.3 mg·cm$^{-2}$ Hr$^{-1}$ whereas for the samples taken from the prior art gloves the average permeability was 10.4 mg·cm$^{-2}$ Hr$^{-1}$.

The tests were performed by an independent test organisation (SATRA Technology Centre, Kettering, Northamptonshire, UK). This organisation uses the following classification for water vapour permeability:
Very High permeability—over 5.0 mg·cm$^{-2}$ Hr$^{-1}$
High permeability—between 2.6 and 5.0 mg·cm$^{-2}$ Hr$^{-1}$
Moderate permeability—between 1.0 and 2.5 mg·cm$^{-2}$ Hr$^{-1}$
Low permeability—under 1.0 mg·cm$^{-2}$ Hr$^{-1}$ Therefore, both sets of samples can be considered to have very high permeability (with the exception of sample 2 of Table 1). It can be seen that the permeability of the prior art gloves is much higher than the gloves made according to the method of this invention. However, when the gloves of the current invention are worn there is significantly less build of perspiration than when the prior art gloves are worn. This can be explained by considering the absorption figures: the gloves embodying the invention absorb far more water than the prior art gloves. Therefore, for the gloves embodying the invention, when worn, some of the perspiration is taken from the hand of the wearer and held in the glove and some of the perspiration permeates (i.e. escapes from) the glove, hence there is less perspiration build on the inner surface of the glove. It is believed that the gloves embodying the invention absorb more water because the polymer layer has larger interstitial spaces compared to the prior art due to the method of manufacture of the gloves (i.e., the method of the invention uses foamed polymer which is then washed off, for example with a water spray, before fully coagulating, whereas, for the prior art method the glove liner/substrate is dipped in a solution of polymer and then immersed in water to coagulate the polymer solution). The interstitial spaces give the gloves a 'wicking action', that is water is pulled into the gloves by capillary action.

Figure 10:
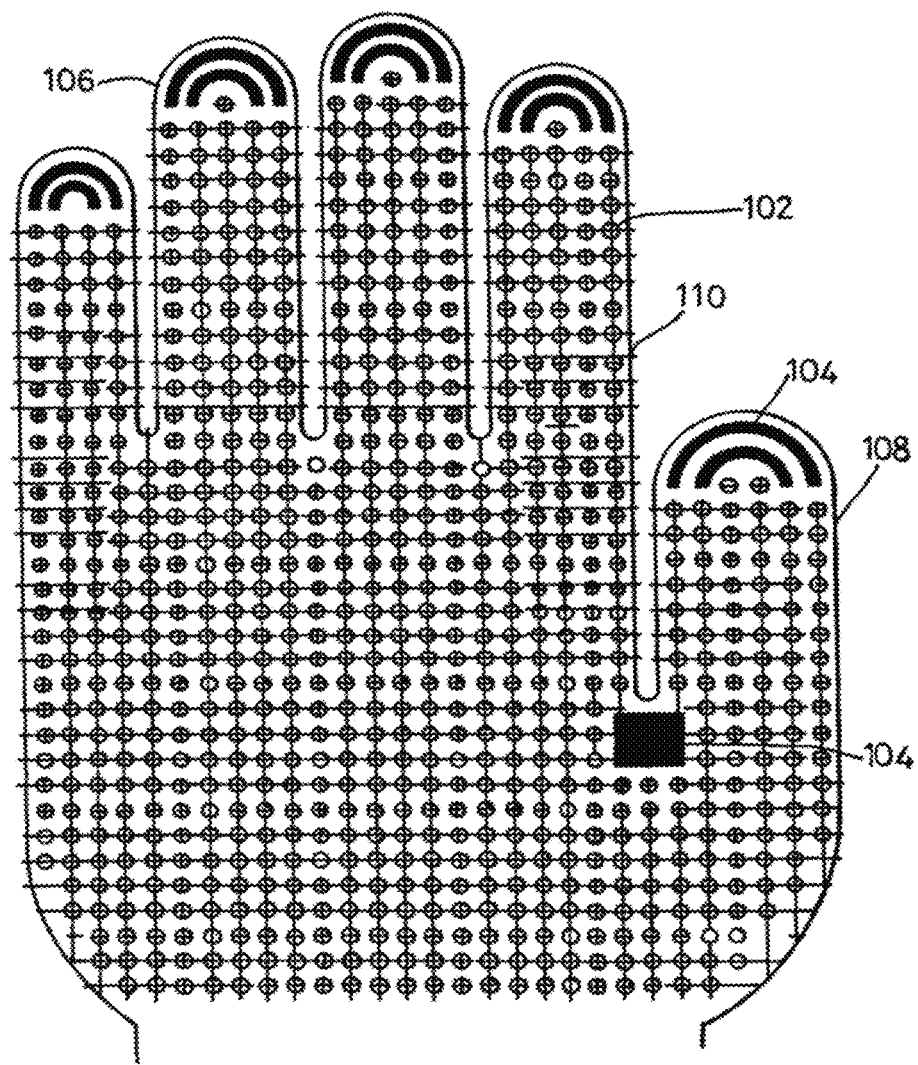

According to a further embodiment of the invention, an array of discrete areas of polymeric material is applied to the surface of the gloves so that it covers areas of the foamed and coagulated polymer to provide a protective coating. For example, this could comprise an array of dots. This coating of polymeric material increases the abrasion resistance of the layer of coagulated polymeric foam. Referring to FIG. 10, the dots 102 are applied in an array across the surface of the glove. Additional patches of the coating 104 are applied to particular parts of the surface of the glove, such as between the finger portions and at the fingertips. These are areas that are likely to be subjected to greater wear or abrasion and where larger patches of abrasion resistive coating are particularly valuable.

In the embodiment shown in FIG. 10, the dots 102 are circular and spaced evenly across the surface of the glove. The further reinforcing patches 104 on the fingertips 106 are in the form of semi-circular strips and a further area is applied between the thumb 108 and the index finger 110. However, it will be appreciated that areas of coating of any shape and size could be applied to a garment. For example, the reinforcing patches on the fingertips could be solid areas of coating and areas could be applied between each finger. The coating could also be applied to garments other than gloves. For example, an area of coating could be applied to the heel of a sock and an array of smaller discrete areas could be applied to the sole.

Figure 11:
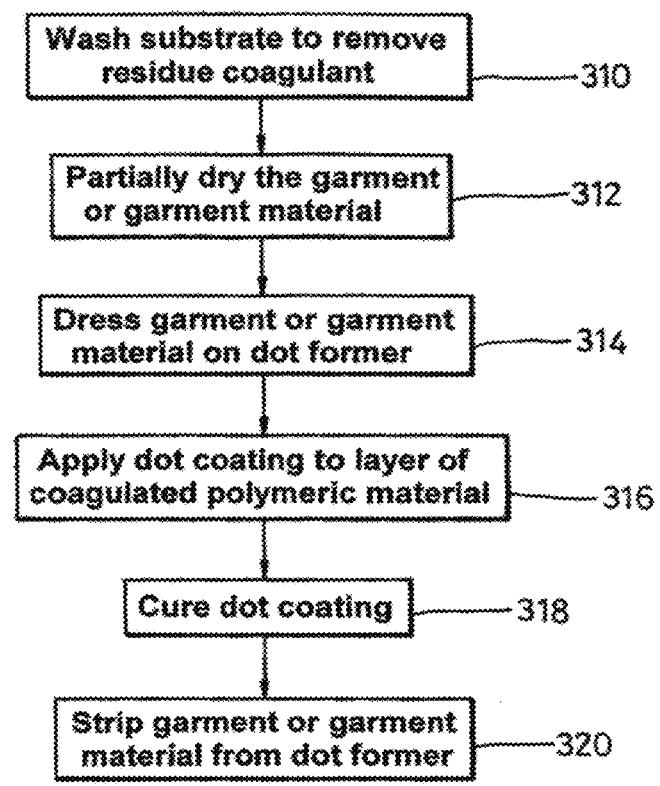

FIG. 11 illustrates the steps of applying the discrete areas of a polymer coating of FIG. 10 to the layer of coagulated polymeric foam of a garment. After the gloves have been produced using the method of FIG. 3, the foam-coated gloves are washed with a solution of cold water and detergent at step 310 to remove any residual coagulant left in the glove coating. This removal of any residual coagulant is important for achieving good adhesion between the dots and the foam coating. The gloves may be washed by immersion into a bath/trough of the water and detergent or alternatively, jets of water and detergent may be sprayed onto the gloves through nozzles such as those in spraying station 52 used in an earlier step of glove production. At step 312 the gloves are partially dried at a temperature of between about 50° C. and 70° C. until damp. The damp condition of the gloves further improves the adhesion of the dots to the foam coating.

In order to apply the dots, the partially dry gloves are dressed onto flat formers, shown at step 314. A dot coating can then be applied at step 316, either manually or using a machine. The thickness of the dot coating applied should be around 0.2-2.0 mm. The dotting compound may be one of a number of suitable polymeric materials such as nitrile latex, natural latex, PU latex, latex or a blend of two or more of these and should have a viscosity of about 100 to 400 poise.

At step 318 the dotted gloves are cured in an oven, such as oven 44 for a period of between 30 and 45 min at a temperature of 60° C.-140° C. Alternatively, the dot coating may be cured in two stages. The first stage comprises 15-30 min at 60° C.-80° C. and the second comprises 20-40 min at 120° C.-150° C. The thickness of the dot coating after curing is reduced to around 0.05-1.0 mm. Latex polymers are used because they cure at lower temperatures than the PNC known to be used for the dots on prior art gloves. Latex polymers are also known to have better abrasion resistance than PNC. The final stage of the dotting process, shown at step 320, involves manually stripping the glove from the dot former. The resulting thickness of the foam coating and dot layer of the finished glove is around 0.3-1.8 mm.

Figure 12:
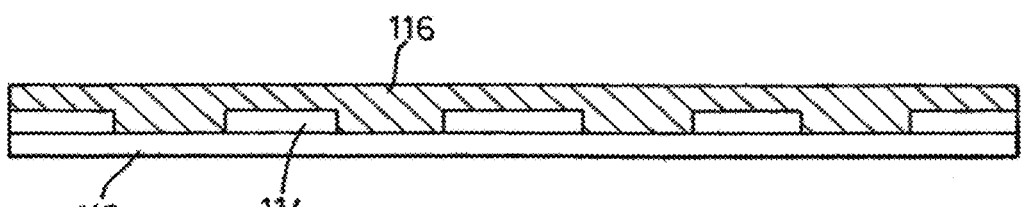
Figure 13:
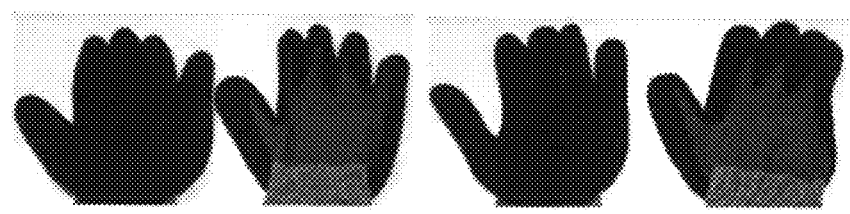
FIG. 13 shows Maxiflex 34-87A gloves treated with anti-perspirant and cooling encapsulated essential oils (Formula A and Formula B) according to the protocol set out above (left panel) and Maxiflex Ultimate 34-874 gloves untreated (right panel).

FIG. 12 illustrates the layers of substrate 112, porous coagulated foam 114 and polymeric coating 116. Dots applied to prior art gloves can be easily rubbed off due to the poor bonding between the dots and the coating. However, the porous foam coating 114 of the gloves according to this invention means that material of the dots 116 extends through the pores 118 in the foam 114 and anchors itself to the foam coating 114, improving the bonding between the dots and the coating. There are a number of parameters controlling the bonding between the liner and the dots. These include:

i. the formulation of the polymeric material;
    ii. the formulation of the polymeric foam;
    iii. foam density;
    iv. the temperature and time period for curing the dot coating;
    v. the viscosity of the dot coating; and
    vi. weight and construction of the garment or garment material.

It will be appreciated that any of these factors may be varied to achieve the optimum bonding.

Method 1.

On line treatment as part of production of a garment on a mould. After the excess and partially coagulated foamed polymer is removed from the garment by showering, according to the method of the present application, the additional dressing treatment step may be done to add a dressing composition that imparts cooling and antiperspirant properties to the garment.

1. Wash by spraying to remove residual coagulant
2. Partially dry for 5 mins at 80° C.
3. Dip in to a bonding solution 1 to 5 percent solution of PVA in water. SBR EVA(PU or NBR) or blends of bonding agents can be used.
4. Drain for 5 mins at ambient temperature.
5. Dip and dwell for 5 mins into Formula A maintained between 50-85° C.
6. Withdraw and drain for 5 mins.
7. Dry in an oven for 20-30 mins at 60° C.
8. Dip and dwell for 5 mins into Formula B maintained between 50-85° C.
9. Withdraw and drain for 5 mins.

10. Continue with standard production passing through main curing as detailed in the patent
11. Garments are stripped from formers and washed to remove impurities.
12 Since the dressing composition can withstand very many washings the effectiveness is not affected.

Washing to remove unwanted impurities is not affected by the washing.

Alternatively, the garments at 5 can be dipped into an equal blend of Formula A and B and steps 8 and 9 omitted.
Method 2.

Off line after treatment of finished garments produced by our patented method and removed from moulds.

Wash the garments for between 20-40 mins in Formula A maintained between 50-85° C. with rotation very 5-10 mins.
Garments are spin dried for 2-5 mins.
Garments are dried for 20-40 mins between 40-80° C.
Follow the same procedure using Formula B Alternatively the garments can be washed in an equal blend of Formula A and B and following the steps 1 to 3 as above.

Formula A.
Hot water (50-85° C.)
Textile Binder 1-2 gm/L
Blend of Encapsulated Cooling Essential Oils 2-5 gm/L
Encapsulated essential oils comprise the essential oil or blend of essential oils and a shell or coating encapsulating the essential oils.
Formula B.
Hot water (50-85° C.)
Blend of Encapsulated Antiperspirant Essential Oils 2-5 gm/L
Encapsulated essential oils comprise the essential oil or blend of essential oils and a shell or coating encapsulating the essential oils.

When gloves were treated according to the above methods the total amount of encapsulated essential oils and bonding agent (binder) that stuck to each pair of gloves is about 0.088 gms. That can be broken down as follows:
EO 0.0366 g
AO 0.0366 g
Binder 0.0146 g The amount of encapsulated essential oils and bonding agent (binder) per sq mtr of surface were:
EO 0.340 g/sqmtr
AO 0.340 g/sqmtr
Binder 0.136 g/sqmtr Testing of Gloves with and without Dressing Compound Gloves were tested while carrying out a manual activity inside a heated climate chamber. Thermal images were taken of the test subject's hands before, during and after this manual activity in order to observe any notable trends. The thermal comfort of the hand was assessed using thermal images and a subjective questionnaire and, the perspiration of the hand and moisture uptake of the gloves were monitored by monitoring the mass gain of the gloves throughout a 45 minute manual task at 27° C. and 60% rh. The combination of a subjective questionnaire and quantitate data from the mass gain and thermal images obtained from two subjects showing the differences between the two gloves.

Two different variations of the same style of glove were submitted; Maxiflex 34-87A and Maxiflex Ultimate 34-874. The first samples had been treated and were to be directly compared to the untreated sample whilst carrying out the same task in the same conditions.

Method

The submitted samples were conditioned for 48 hours at 23° C. and 50% relative humidity (rh), the environmental chamber where the testing was completed was set to 27° C. and 60% rh. The subject entered the chamber and donned the gloves which had been weighed individually at the start of the test, Questions 1 and 2 from the questionnaire were asked regarding initial impressions of the glove. The subject then began the manual task of putting bolts into a peg board, securing them with washers and bolts and then tightening them up using spanners.

Figure 14:
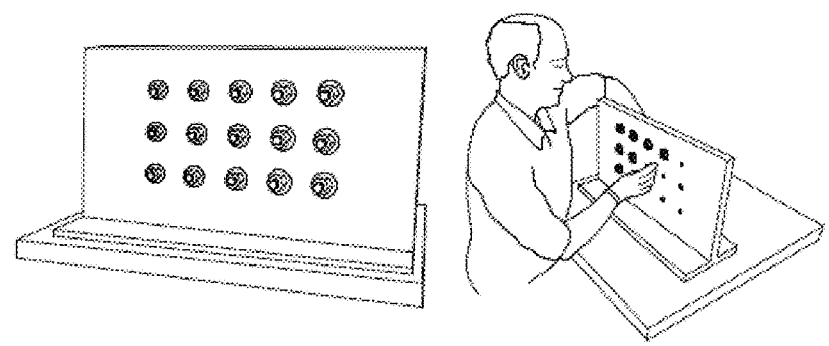
FIG. 14 shows The complete set up of the MDF board with holes, nuts and bolts used for testing gloves (left panel) and a manual task being completed (right panel (right panel).

The test board, shown in FIG. 14, was made up of 12 mm MDF with 15 holes in it to allow for 15 12 mm nuts, bolts and washes to be affixed. The subject was instructed to fill the board completely with the 15 bolts and washers provided and then once completed remove the bolts and washers, this task was repeated for a 15 minute period. After 12 minutes of the 15 the subject answered Questions 3-7 whilst continuing to complete the task, once the fifteen minutes were up the gloves were removed and weighed individually whilst Question 8 was answered and thermal images of the right and left hands were taken.

The same method was carried out for the second pair of gloves and the second test subject. In conjunction with the Questionnaire any additional comments made by the subject were documented to allow for comparisons to be made between the two subjects' opinions of the gloves during the task.

Results and Discussion

The gloves were repositioned on the hand and Question 9 was answered then the task was started again for the second 15 minute period. After 12 minutes Questions 10-14 were asked and after the completed 15 minutes the gloves were removed and weighed individually whilst Question 15 was answered and thermal images of the right and left hands were taken. The gloves were repositioned on the hand and Question 16 was answered then the task was started again for the third 15 minute period. After 12 minutes Questions 17-21 were asked and after the completed 15 minutes the gloves were removed and weighed individually whilst Question 22 was answered and thermal images of the right and left hands were taken.

Thermal images of the left hand of subject 1 at the start of the test, after 30 minutes and at the end of the test using a treated glove and an untreated glove are shown in FIG. 15. As can be seen, the image of the hand in both the untreated and the treated gloves at the start of the test show mostly blue and green colours indicating that the hand was cool. The hand of the subject in the treated glove was slightly warmer at the start of the test as can be seen from slightly more green colouring on the thermal images. This is due to natural variation of the temperature of the hand. After 30 minutes of the test the image showing the hand when using the treated glove shows mainly green and yellow areas, while the image showing the hand when using the un-treated glove shows mainly red and some yellow areas. Even though the hand in the treated glove had been slightly warmer than the hand in the untreated glove at the start of the test, the thermal images show markedly more heating of the hand in the untreated glove after 30 minutes compared to the hand in the treated glove. This indicates that the hands of the subject were much warmer after 30 minutes wearing the untreated gloves compared to the treated gloves. The images of the subject's hands at the end of the test in treated gloves shows mainly green and yellow areas similar to those in the image taken after 30 minutes with the treated glove. The image of the subject's hand at the end of the test in the untreated glove shows mainly red and some yellow areas similar to the image taken in the untreated glove after 30 minutes. This indicates that the subject's hands were much cooler after 30 minutes and at the end of the test when he wore treated gloves to carry out the manual task compared to when he wore untreated gloves.

The questionnaires allow for subjective results to be combined with the objective data collected from the weight recordings and thermal images taken giving an overview as to which glove performed the best during testing.

Discussion

The treated and Un-treated gloves referenced Maxiflex 34-87A and Maxiflex Ultimate 34-874 in size 9 were evaluated using an ergonomic assessment on two subjects in a climate chamber at 27° C. and 60% rh to measure the mass gain from perspiration and thermal imagery to calculate the heat build-up during the ergonomic assessment.

The evaluation was separated into two sections ergonomic assessment in terms of physically placing and removing nuts and bolts dexterity test whilst answering a questionnaire relating to the comfort and cosseting effect of the gloves whilst undertaking the ergonomic test. To give some indication of perspiration the gloves were weighed every 15 minutes during the test and thermal image taken of the subjects hands.

Feedback from the questionnaire showed none of the test subjects felt unpleasant levels of moisture in the treated gloves during the ergonomic dexterity test.

On reviewing both the moisture gain measurements and the thermal images taken during the tests, the moisture gain between the treated and un-treated gloves. The treated glove showed a reduction in moisture uptake of more than 50% compared with the un-treated glove, this was also confirmed by the thermal images of the hands taken during the 45 minutes test, showing a clear decrease in heating with the treated gloves compared to the untreated gloves.

Evaluation of Reduction of Hand Perspiration with an Industrial Glove Test Product Testing to Determine the Reduction of Hand Perspiration with an Industrial Glove Test Product.

The samples tested were Gloves Style: Maxiflex Ultimate Code: 34-876 Size: 09 Date: Feb. 4, 2013 S.R.No: Non Treated and Advanced Technology Gloves Style Maxiflex Ultimate Code: 34-876 Size: 09 Date: Feb. 2, 2013 S.R.No: Treated Formula A and Formula B was received from ATG Ceylon(Pvt) Ltd. and assigned AMA Lab Nos.M-9445 and M-9446 respectively.

Number of subjects enrolled 10
Number of subjects completing study 10
Age Range 21-56 years
Sex Male 10
Race Caucasian 7
  Hispanic 3
Procedure The gravimetric method was utilized to determine the efficacy of the antiperspirant product.

Hand Examination

Subjects were screened for hand irritation prior to being accepted in the study.

Baseline Sweat Collection

During the first 40 minutes of the sweat stimulation period, the subjects wore the untreated gloves. The warm up period was followed by a 20 minute baseline sweat collection. Subjects producing 100 mg or more of sweat/20 minutes/hand were inducted into the study.

Supervised Washes

Supervised washes were conducted after Baseline sweat collection followed by one hour dry time.

The subjects were instructed to wash according to the following procedure. Wash both hands for 10 seconds using liquid Ivory soap. Rinse both hands thoroughly until all soap is removed. Gently pat dry both hands using a dry disposable towel.

Treatment Assignment/Application

For each subject the assignment of the treated gloves to right or left hand was randomized (refer to table 3). Treated glove was assigned to one hand while the contralateral hand was assigned untreated glove.

All subjects were instructed to flex their hands 5 times per minute during the test period to simulate hand movement.

TABLE 3

| | Treatment Randomization Schedule | |
|---|---|---|
| AMA Lob Nos.: | M-9445 | M-9446 |
| Client Nos.: | Advanced Technology Gloves Style: Maxiflex Ultimate Code: 34-876 Size: 09 Date: Feb. 4, 2013 S.R. No: Non Treated | Advanced Technology Gloves Style: Maxiflex Ultimate Code: 34-876 Size: 09 Date: 2013/04/02 S.R. No: Treated |
| Subject ID #: | | |
| 68 6787 | Left Hand | Right Hand |
| 27 8204 | Right Hand | Left Hand |
| 64 4259 | Left Hand | Right Hand |
| 50 1810 | Right Hand | Left Hand |
| 60 0557 | Left Hand | Right Hand |
| 72 8511 | Right Hand | Left Hand |
| 48 4541 | Left Hand | Right Hand |
| 94 4890 | Right Hand | Left Hand |
| 70 3866 | Left Hand | Right Hand |
| 42 4991 | Right Hand | Left Hand |

TABLE 4

| Step 1 | Medical Screening followed by baseline sweat collection wearing untreated gloves. |
|---|---|
| Step 2 | Hand wash followed by One hour wait and dry time. |
| Step 3 | Sweat Collection I and Sweat Collection II (application of treated vs. untreated gloves). |

Sweat Stimulation

Sweating was induced in a constant temperature (100° F.+/−2° F.) and humidity (35%+/−5% Rh) controlled test chamber. The temperature and humidity condition in the hot room was recorded.

Sweat Collections

During the first 40 minutes of the sweat stimulation period, the subjects wore the untreated gloves. This preliminary warm-up period was followed by two 20 minute sweat collection period, during which the subjects were assigned untreated glove to one hand while the contralateral hand was assigned the treated glove. All subjects were instructed to flex their hands 5 times per minute during the test period to simulate hand movement.

These gloves were weighed in zip-lock storage bags before and after use. During the sweat stimulation and collection periods, the subjects were required to, sit in an erect position with both feet flat on the floor and with their arms resting against their sides in a symmetrical manner. Insertion and removal of the weighed gloves was conducted by laboratory technicians. The process was carried out at approximately 5 minute intervals as the technician moved from subject to subject in the test chamber.

Data Treatment

The ratio of test hand perspiration to control hand perspiration, adjusted for the ratio of right-to-left hand sweating rate, is defined for each subject by the formula:

$$Z=(PC \times T)/(PT \times C)$$

Where Z is the adjusted perspiration ratio, PC is the pre-treatment measure of moisture for the hand with untreated gloves, PT is the pre-treatment measure for the test hand, T is the treated measure for the test hand, and C is the corresponding quantity for the hand with untreated gloves.

Mean and median values were calculated to measure the central tendency of the adjusted perspiration ratio (Z) values.

No adverse effects or unexpected reactions were seen in any of the subjects.

Results are shown in table 5 (FIG. 20). Within the limits imposed by the conduct and population size of the study described herein, the average amount of hand perspiration with the treated gloves (AMA Lab. No.: M-9446; Client No.: Advanced Technology Gloves Style: Maxiflex Ultimate Code: 34-876 Size: 09 Date: Feb. 4, 2013 S.R.No: Treated) was significantly less than the average amount of hand perspiration with the untreated gloves (AMA Lab. No.: M-9445; Client No.: Advanced Technology Gloves Style: Maxiflex Ultimate Code: 34-876 Size: 09 Date: Feb. 4, 2013 S.R.No: Non Treated).

The average % Adjusted Reduction in the amount of sweat collected with the treated gloves was 30.04% justifying the conclusion that the test material (AMA Lab. No.: M-9446; Client No.: Advanced Technology Gloves: Maxiflex Ultimate Code: 34-876 Size: 09 Date: Feb. 4, 2013 S.R.No: Treated) qualifies as an extra-effective antiperspirant glove test product.

Antimicrobial Testing

AATCC 100:1993 antimicrobial testing on gloves described as Maxiflex 34-874-treated with Formula A and Formula B above.

Gloves Maxiflex 34-874—Treated with cooling and antiperspirant encapsulated essential oils (Formula A and Formula B) were received on the 22 Jan. 2013 for assessment of antibacterial properties in accordance with AATCC 100:1993—assessment of antibacterial finishes on textile materials.

The microbiological testing was carried out by an external laboratory and the findings were reported under their reference 73M39.

Samples Received:

Maxiflex 34-874—Treated Conclusion:

The glove samples described above were analysed in accordance with AATCC 100:1993 and were found to kill greater than 99.999% of bacteria when inoculated with *Staphylococcus aureus* and *Klebsiella pneumonia* after an exposure time of 24 hours. Full results are included in the table below.

Test Organisms:

*Staphylococcus aureus* ATCC 6538 *Klebsiella pneumonia* NC09633

Media:

Due to the nature of the product, 0.1 ml of inoculum was added to a 20×20 mm test specimen. Testing was performed on the palm areas of the gloves only. The Recovery medium was supplemented with 3% Tween 80+0.3% Soya Lecithin.

TABLE 6

| Sample | Replicate | Recovery per test piece (cfu) S aureus ATCC 6538 | Recovery per test piece (cfu) K pneumonia NC09633 | % Reduction (minimum) S aureus ATCC 6538 | % Reduction (minimum) K pneumonia |
|---|---|---|---|---|---|
| Ino cul | | $3.2 \times 10^7$ | $3.1 \times 10'$ | | |
| Maxiflex 34-874 Treated gloves | 1 | <10 | <10 | >99.999 | >99.999 |
| | 2 | <10 | <10 | | |
| | 3 | <10 | <10 | | |
| | 4 | <10 | <10 | | |

FIG. 19 shows schematically the layer structure of the garment material with dressing compounds stuck to it. Layer 10 is a substrate material. This may be a woven or knitted fabric, for example a woven or knitted cotton or man-made fibre fabric or a woven or knitted fabric of mixed fibres, for example a mixture of knitted nylon or a blend of 95% nylon and 5% lycra. FIG. 16 shows the fibres in detail with the encapsulates bonded to them. Layer 11 is a polymeric foam material adhered to the substrate material, having an open pore structure and having many depressions on the exposed surface away from the substrate material. The open pore structure and depressions are formed by polymerizing the foam starting at the side that is in contact with the substrate material. When a sufficient thickness of polymeric foam has polymerized on the substrate material the excess un-polymerized foam is removed to expose the outermost layer of polymerized foam. The exposed surface formed by removing excess un-polymerized foam contains bubbles that are broken open and leave depressions and recesses in the exposed surface of the foam. The polymeric foam layer does not have a skin formed on the exposed surface. This foam layer, with the encapsulates bonded to it, is shown in more detail in the images of FIGS. 17 and 18.

Layer 15 is a layer of bonding agent on the inner surface of the substrate material. The layer of bonding agent may be much thinner than shown in FIG. 19. The layer of bonding agent may cover the whole surface of the substrate material as a thin layer or the bonding agent may only be present in discrete sections that exist between the particles of encapsulated essential oils and the surface of the substrate material. In particular, as shown in FIG. 16, the encapsulates may be substantially smaller in diameter than the fibres of the substrate, and the bonding agent may bond the individual encapsulate particles to the surface of the fibres of the substrate. The bonding agent may be any suitable bonding agent, such as a bonding agent that is not harmful in contact with the skin. For example, the bonding agent may comprise one or more of polyvinyl alcohol (PVA), polyurethane (PU), nitrile rubber (NBR), PVA, styrene butadiene (SBR) and/or ethylene vinyl acetate (EVA). Encapsulated dressing compounds 12 are stuck to the inside of the substrate layer in the bonding agent. The dressing compounds may comprise cooling or anti-perspirant compounds, for example cooling or anti-perspirant essential oils or mixtures of cooling and/or anti-perspirant essential oils. The dressing compounds may be encapsulated essential oils, for example particles comprising a liposome or polymer shell with one or more essential oils inside.

Layer 16 is a layer of bonding agent on the exposed surface of the polymeric foam material. The layer of bonding agent may be much thinner than shown in FIG. 19. In particular, as shown in FIGS. 17 and 18 the bonding agent may coat the internal surfaces of the cavities and depressions in the surface of the foam material, as well as the external surfaces of the foam material. The layer of bonding agent may cover the whole of these surfaces of the polymeric foam as a thin layer, or the bonding agent may only be present in discrete sections that exist between the particles of encapsulated essential oils and the surface of the polymeric foam. The bonding agent may be the same bonding agent that is on the inner surface of the substrate layer. The bonding agent 16 may be any suitable bonding agent, such as a bonding agent that is not harmful in contact with the skin. For example, the bonding agent may comprise one or more of polyvinyl alcohol (PVA), polyurethane (PU), nitrile rubber (NBR), PVA, styrene butadiene (SBR) and/or ethylene vinyl acetate (EVA). Dressing compounds 13 and 14 are stuck to the exposed surface of the polymeric foam material by the bonding agent, and also to the internal surfaces of the cavities and depressions in the surfaces of the foam material. The dressing compounds may be stuck on the outer part of the exposed surface 13 and within the depressions and recesses in the exposed surface of the polymeric foam 14. This is advantageous because dressing compound that is stuck within the depressions and recesses in the polymeric foam are less likely to be rubbed off the surface when the garment material is used. Also, as the encapsulate particles are of a significantly smaller scale than the cavities and depressions, those cavities and depressions can remain open and substantially un-filled, so that the foam can retain its absorbent properties. The dressing compounds may comprise cooling or anti-perspirant compounds, for example cooling or anti-perspirant essential oils or mixtures of cooling and/or anti-perspirant essential oils. The dressing compounds may be encapsulated essential oils, for example particles comprising a liposome or polymer shell, for example of melamine or gelatine, with one or more essential oils inside.

The invention claimed is:

1. A method of making garment material, the method comprising the steps of:
    a) fitting a substrate on a mould;
    b) applying a coagulant to the substrate and then applying a layer of foam of a polymeric material to the substrate;
    c) allowing for the coagulant to coagulate some of the foam for a controlled period so that an underside of the layer of foam polymeric material, which is closest to the substrate, coagulates to form a coagulated layer and an outer part of the foam layer does not coagulate and forms an uncoagulated layer;
    d) removing the uncoagulated foam layer before a film skin can form on the layer of foam, to leave a cohesive, porous, and breathable coagulated layer of polymeric material on the substrate, and
    e) removing the garment material comprising the substrate and the coagulated polymeric material from the mould, and wherein before and/or after step e), one or more bonding agents and one or more dressing compounds are applied to the garment material such that the dressing compounds are bonded to a surface of the garment material,
    wherein the dressing compound comprises encapsulated antiperspirant essential oils and/or encapsulated cooling essential oils.

2. The method of claim 1, wherein the bonding agents are applied before the dressing compounds are applied and/or at the same time as the dressing compounds are applied.

3. The method of claim 1, wherein two or more dressing compounds are applied sequentially or simultaneously.

4. The method of claim 1, wherein the bonding agents are a liquid or solution comprising one or more of polyvinyl alcohol (PVA), polyurethane (PU), nitrile rubber (NBR), PVA, styrene butadiene (SBR) and/or ethylene vinyl acetate (EVA).

5. The method of claim 1, wherein the dressing compound is a liquid suspension comprising one or more compounds that provides an antiperspirant and/or cooling effect to the garment material.

6. A method of making garment material, the method comprising the steps of:
    a) fitting a substrate on a mould;
    b) applying a coagulant to the substrate and then applying a layer of foam of a polymeric material to the substrate;
    c) allowing for the coagulant to coagulate some of the foam for a controlled period so that an underside of the layer of foam polymeric material, which is closest to the substrate, coagulates to form a coagulated layer and an outer part of the foam layer does not coagulate and forms an uncoagulated layer;
    d) removing the uncoagulated foam layer before a film skin can form on the layer of foam, to leave a cohesive, porous, and breathable coagulated layer of polymeric material on the substrate, and
    e) removing the garment material comprising the substrate and the coagulated polymeric material from the mould, and wherein before and/or after step e), one or more bonding agents and one or more dressing compounds are applied to the garment material such that the dressing compounds are bonded to a surface of the garment material, and
    wherein the step of applying one or more bonding agents and one or more dressing compounds to the garment material comprises:
        i) dipping, washing or soaking the garment material in a 1 to 5% solution of PVA, PU or NBR, and optionally one or more dressing compositions, in water and allowing it to drain;
        ii) dipping, washing or soaking the garment material in a dressing composition, for example a suspension comprising 2 to 5 grams of encapsulated essential oils per litre of water at between 50° C. and 80° C.;
        iii) allowing excess liquid to drain from the garment material;
        iv) optionally repeating steps ii) and iii) with a different dressing composition.

7. A method of making garment material, the method comprising the steps of:
    a) fitting a substrate on a mould;
    b) applying a coagulant to the substrate and then applying a layer of foam of a polymeric material to the substrate;
    c) allowing for the coagulant to coagulate some of the foam for a controlled period so that an underside of the layer of foam polymeric material, which is closest to the substrate, coagulates to form a coagulated layer and an outer part of the foam layer does not coagulate and forms an uncoagulated layer;
    d) removing the uncoagulated foam layer before a film skin can form on the layer of foam, to leave a cohesive, porous, and breathable coagulated layer of polymeric material on the substrate, and
    e) removing the garment material comprising the substrate and the coagulated polymeric material from the mould, and wherein before and/or after step e), one or more bonding agents and one or more dressing compounds are applied to the garment material such that the dressing compounds are bonded to a surface of the garment material, and wherein the controlled period is such that the garment material when subjected to a temperature of 20±2° C. and a relative humidity of 65 ±2% for 265 minutes, will hold between 1.0 mg and 8.5 mg of water per cm2 of the garment material.

8. The method of claim 1, wherein the substrate comprises knitted nylon or a blend of 95% nylon and 5% lycra.

9. The method of claim 1, comprising a step of immersing the substrate in water to remove coagulant after the step of removing the uncoagulated foam from the substrate and/or comprising a step of drying the substrate after a step of immersing the substrate in water.

10. The method of claim 1, wherein the coagulant is an aqueous solution of one or more electrolytes or wherein the coagulant is an alcoholic solution of one or more electrolytes and/or wherein the polymeric material comprises at least one of: nitrile latex, natural latex, polyurethane latex, polyvinyl chloride latex, neoprene and polyvinylacetate.

11. The method of claim 1, further comprising the step of applying a coating in an array of discrete areas to the layer of coagulated polymeric material, wherein the coating may optionally comprise at least one of: nitrile latex, natural latex, PU latex and latex.

12. The method of claim 1, further comprising at least one of the steps of:
   washing the garment material to remove residue;
   partially drying the garment material;
   providing an array former; and
   dressing the garment material on the array former before applying the coating; and
   then curing the layer of coating; and
   stripping the garment material from the array former.

* * * * *